US012741250B2

(12) United States Patent
Pinnau et al.

(10) Patent No.: US 12,741,250 B2
(45) Date of Patent: Sep. 22, 2026

(54) CARBON MOLECULAR SIEVE MEMBRANES BASED ON OXYGEN-FREE POLYMERIC PRECURSORS

(71) Applicant: King Abdullah University of Science and Technology, Thuwal (SA)

(72) Inventors: Ingo Pinnau, Thuwal (SA); Khalid Hazazi, Thuwal (SA); Yingge Wang, Thuwal (SA); Bader Ghanem, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 755 days.

(21) Appl. No.: 18/022,684

(22) PCT Filed: Aug. 25, 2021

(86) PCT No.: PCT/IB2021/095001

§ 371 (c)(1),
(2) Date: Feb. 22, 2023

(87) PCT Pub. No.: WO2022/043981

PCT Pub. Date: Mar. 3, 2022

(65) Prior Publication Data

US 2023/0311073 A1 Oct. 5, 2023

Related U.S. Application Data

(60) Provisional application No. 63/070,787, filed on Aug. 26, 2020.

(51) Int. Cl.
*B01D 71/02* (2006.01)
*B01D 53/22* (2006.01)
(Continued)

(52) U.S. Cl.
CPC ......... *B01D 71/021* (2013.01); *B01D 53/228* (2013.01); *B01D 67/0067* (2013.01);
(Continued)

(58) Field of Classification Search
CPC .. B01D 53/228; B01D 67/0067; B01D 69/02; B01D 71/021; B01D 2257/7022; B01D 2323/081; B01D 2325/0283
See application file for complete search history.

(56) References Cited

U.S. PATENT DOCUMENTS

2016/0102177 A1* 4/2016 Ghanem ........... C08G 73/1075 95/55
2016/0346740 A1 12/2016 Koros et al.
(Continued)

FOREIGN PATENT DOCUMENTS

WO 2011053403 A1 5/2011
WO 2017160817 A1 9/2017
(Continued)

OTHER PUBLICATIONS

"International Preliminary Report on Patentability Received mailed on Mar. 9, 2023", 8 Pages.
(Continued)

*Primary Examiner* — Robert Clemente
(74) *Attorney, Agent, or Firm* — Billion & Armitage

(57) ABSTRACT

Embodiments of the present disclosure provide a carbon molecular sieve membrane (and precursors therefor) including a pyrolysis product of an oxygen-free ladder polymer of intrinsic microporosity. Embodiments of the present disclosure further provide a method of gas separation including contacting a fluid including one or more gas components with a carbon molecular sieve membrane, wherein the carbon molecular sieve membrane includes a pyrolysis product of an oxygen-free ladder polymer of intrinsic microporosity, and separating at least one of said gas components from the fluid. Embodiments of the present disclosure further provide a method of preparing a carbon molecular sieve membrane including heating an oxygen-free ladder polymer of intrinsic microporosity to a pyrolysis temperature in an oxygen-free atmosphere to form, optionally without producing any oxygen-containing gas, a pyrolysis product.

11 Claims, 14 Drawing Sheets

(51) Int. Cl.
*B01D 67/00* (2006.01)
*B01D 69/02* (2006.01)

(52) U.S. Cl.
CPC ...... *B01D 69/02* (2013.01); *B01D 2257/7022* (2013.01); *B01D 2323/081* (2022.08); *B01D 2325/0283* (2022.08)

(56) References Cited

U.S. PATENT DOCUMENTS

| | | | | |
|---|---|---|---|---|
| 2017/0189859 | A1 | 7/2017 | Chen et al. | |
| 2019/0099722 | A1 | 4/2019 | Hessler et al. | |
| 2019/0185481 | A1* | 6/2019 | Ma | C08G 73/1014 |
| 2019/0194393 | A1* | 6/2019 | Ghanem | C08G 73/1082 |
| 2020/0206696 | A1 | 7/2020 | Ma et al. | |
| 2022/0023804 | A1* | 1/2022 | Ma | B01D 69/02 |

FOREIGN PATENT DOCUMENTS

| | | | |
|---|---|---|---|
| WO | 2019012347 | A1 | 1/2019 |
| WO | 2019212648 | A1 | 11/2019 |
| WO | 2020058850 | A1 | 3/2020 |

OTHER PUBLICATIONS

"International Search Report and Written Opinion Received mailed Nov. 30, 2021", Nov. 30, 2021, 14 pages, PCT/IB2021/095001.

Wang, Y. , et al., "Polymers of intrinsic microporosity for energy-intensive membrane-based gas separations", Materials Today Nano 3 (2018) 69-95.

"Second Office Action for Chinese Patent Application No. 2021800521929, mailed Feb. 11, 2026", 9 Pages.

* cited by examiner

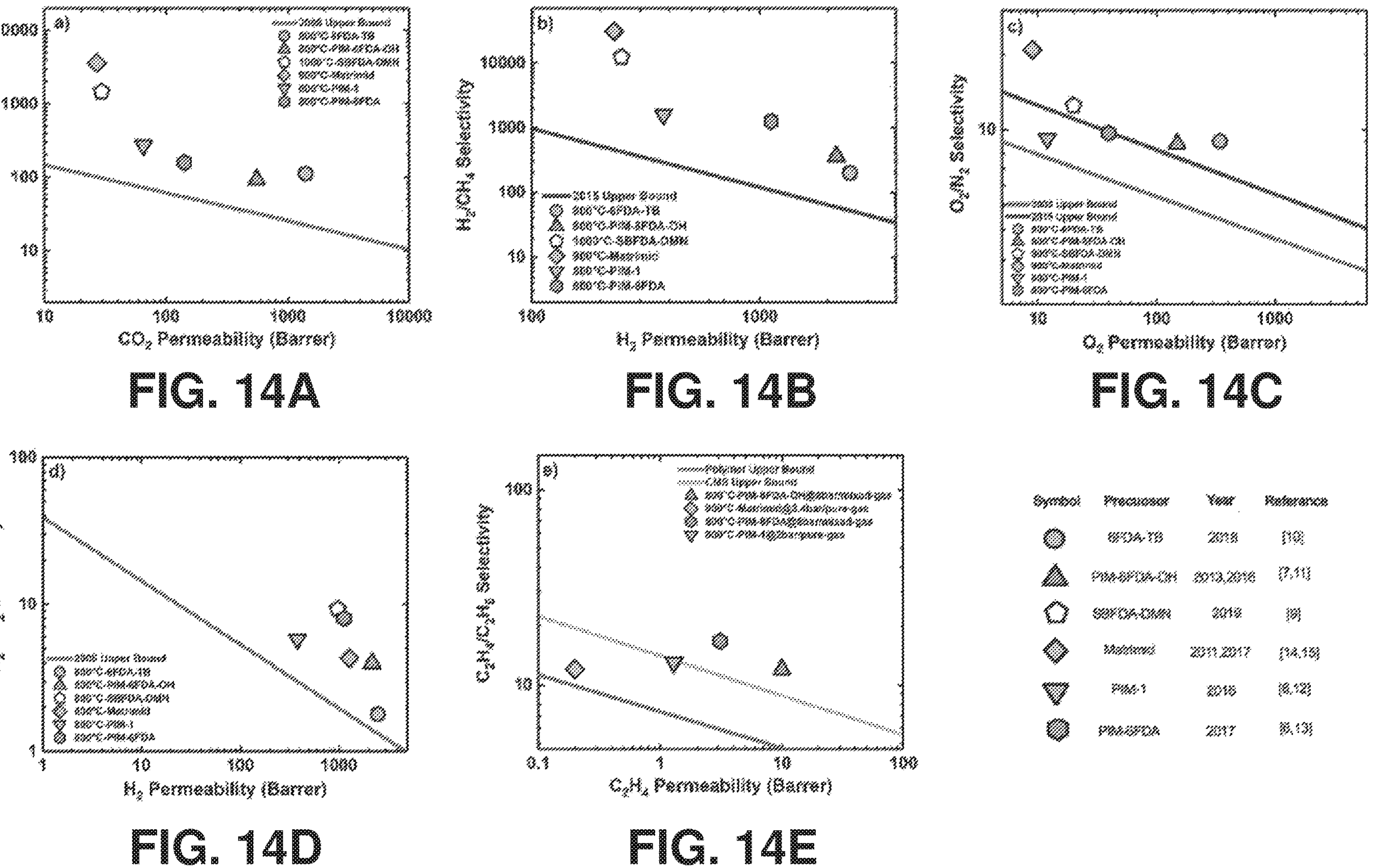
a)
$CO_2/CH_4$ Selectivity
$CO_2$ Permeability (Barrer)
FIG. 14A
b)
2015 Upper Bound
$H_2/CH_4$ Selectivity
$H_2$ Permeability (Barrer)
FIG. 14B
c)
$O_2/N_2$ Selectivity
$O_2$ Permeability (Barrer)
FIG. 14C
d)
$H_2/CO_2$ Selectivity
$H_2$ Permeability (Barrer)
FIG. 14D
e)
Polymer Upper Bound
CMS Upper Bound
$C_2H_4/C_2H_6$ Selectivity
$C_2H_4$ Permeability (Barrer)
FIG. 14E
Symbol Precursor Year Reference
6FDA-TB 2018 [10]
PIM-6FDA-OH 2013,2016 [7,11]
SBFDA-DMN 2019 [9]
Matrimid 2011,2017 [14,15]
PIM-1 2016 [8,12]
PIM-6FDA 2017 [8,13]

CARBON MOLECULAR SIEVE MEMBRANES BASED ON OXYGEN-FREE POLYMERIC PRECURSORS

BACKGROUND

Membrane-based gas separation processes were introduced with the use of polysulfone and cellulose acetate membranes for the recovery of $H_2$ in the synthesis of ammonia and the removal of $CO_2$ from natural gas. Membrane technology thereafter expanded into air and hydrogen separations, natural gas sweetening, and hydrocarbon recovery. Membrane-based gas separation processes continue to emerge in large-scale industrial applications, such as hydrogen recovery from nitrogen- and hydrocarbon-containing petrochemical process streams, onsite nitrogen generation ($O_2/N_2$), and acid gas removal from natural gas ($CO_2$, $H_2S$, etc.). Important potential future applications include separation of olefins from paraffins, including, for example, $C_2H_4$ from $C_2H_6$, $C_3H_6$ from $C_3H_8$, and $H_2$ removal from $CO_2$ in a variety of chemical processes. While advances in membrane technology have focused on new materials for more challenging and energy-intensive applications, efforts to develop materials with the ultra-high selectivity and high permeability required for such separations remains ongoing. More specifically, membranes having strong chemical resistance and high mechanical strength, as well as high permeability and high selectivity have yet to realized.

SUMMARY

In one or more aspects of the invention, a polymer precursor for use in the fabrication of a carbon molecular sieve membrane is provided. The polymer precursor for use in the fabrication of a carbon molecular sieve membrane may include an oxygen-free ladder polymer of intrinsic microporosity.

In one or more further aspects of the invention, a carbon molecular sieve membrane is provided. The carbon molecular sieve membrane may include a pyrolysis product of an oxygen-free ladder polymer of intrinsic microporosity.

In one or more further aspects of the invention, a method of preparing a carbon molecular sieve membrane is provided. The method of preparing the carbon molecular sieve membrane may include one or more of the following steps: heating an oxygen-free ladder polymer of intrinsic microporosity to a pyrolysis temperature in an oxygen-free atmosphere; exposing the oxygen-free ladder polymer of intrinsic microporosity to the pyrolysis temperature for a predetermined duration; and cooling the oxygen-free ladder polymer of intrinsic microporosity to a second temperature.

In one or more further aspects of the invention, a method of gas separation is provided. The method of gas separation may include one or more of the following steps: contacting a fluid including one or more gas components with a carbon molecular sieve membrane, wherein the carbon molecular sieve membrane includes a pyrolysis product of an oxygen-free ladder polymer of intrinsic microporosity, and separating at least one of said gas components from the fluid.

BRIEF DESCRIPTION OF THE DRAWINGS

FIGS. 14A-14E are graphical views showing the separation performance of different CMS membranes: (a) $CO_2/CH_4$, (b) $H_2/CH_4$, (c) $O_2/N_2$, (d) $H_2/CO_2$, and (e) $C_2H_4/C_2H_6$, according to one or more embodiments of the invention.

DETAILED DESCRIPTION

Definitions

Figure 1A:
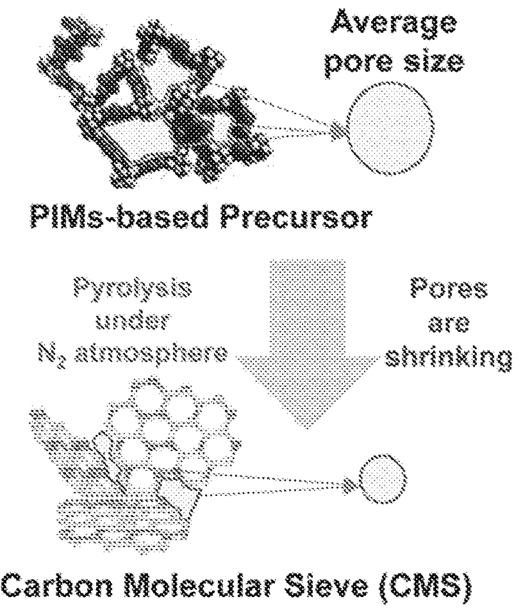
FIGS. 1A-1B shows (a) a schematic diagram of the chemical transformation occurring during pyrolysis, where the structure on the top is a PIM-based polymer and on the bottom structure is a random turbostatic CMS morphology; and (b) a graphical view illustrating the proposed shift in the pore size distribution toward molecular level pore size optimization in the carbon molecular sieves, according to one or more embodiments of the invention.

As used herein, the term "polymer of intrinsic microporosity" refers to any polymer (e.g., polymeric material) characterized by a BET surface area of about 200 $m^2/g$ or greater as measured by nitrogen adsorption at 77 K.

As used herein, the term "oxygen-free" and/or "free of oxygen" refers to any material not including oxygen and/or, in some instances, only including trivial or negligible amounts of oxygen. For example, an oxygen-free ladder polymer of intrinsic microporosity may include a ladder polymer of intrinsic microporosity having a chemical structure (e.g., a repeat unit) that does not include oxygen. A material that previously included oxygen may be oxygen-free may be referred to as oxygen free later on so long as said material is oxygen-free at the time it is used to form the carbon molecular sieve membrane (e.g., said material does not include oxygen in its chemical structure at least prior to being subjected to pyrolysis and/or heat treatment).

As used herein, the term "ladder polymer" refers to any polymer with a backbone including fused rings.

As used herein, the term "pyrolysis product" refers to any substance and/or material resulting from and/or produced by one or more of pyrolysis and heat treatment.

As used herein, the term "CMS" refers to carbon molecular sieve membrane.

As used herein, the term "bivalent" refers to any group having at least two points of attachment; or that is capable of bonding to, or is bonded to, at least two other groups. The term includes groups having two or more points of attachment. For example, tervalent groups would be included within the meaning of the term "bivalent" because tervalent groups have three points of attachment which satisfies the requirement of having at least two points of attachment.

As used herein, the term "alkyl" refers to a straight- or branched-chain or cyclic hydrocarbon radical or moiety comprising only carbon and hydrogen atoms, containing no unsaturation, and having 30 or fewer carbon atoms. The term "cycloalkyl" refers to aliphatic cyclic alkyls having 3 to 10 carbon atoms in single or multiple cyclic rings, preferably 5 to 6 carbon atoms in a single cyclic ring. An alkyl group can be monovalent (e.g., $—CH_3$) or multivalent (e.g., bivalent, such as $—CH_2—CH_2—$) depending upon the structure or formula in which it is used. In some embodiments, a multivalent group is one which has two or more carbon-carbon sigma bonds, such as a $—CH_2—$ or methylene group (i.e., bivalent alkyl group), as compared to a terminal $—CH_3$ (methyl) alkyl group which has only one carbon-carbon sigma bond. Non-limiting examples of suitable alkyl groups include methyl group, ethyl group, propyl group, isopropyl group, cyclopropyl group, butyl group, isobutyl group, sec-butyl group, tert-butyl group, cyclobutyl group, pentyl group, neo-pentyl group, cyclopentyl group, hexyl group, cyclohexyl group, 2-ethylhexyl, cyclohexylmethyl group, heptyl group, octyl group, nonyl group, decyl group, dodecyl group, tridecyl group, tetradecyl group, pentadecyl group, hexadecyl group, heptadecyl group, octadecyl group, nonadecyl group, cyclopentyl group, cyclohexyl group, and the like. Additional examples of cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, adamantyl, and spiro[4.5]decanyl groups, as well as their homologs, isomers, and the like. Preferably, the alkyl group is selected from methyl group, ethyl group, butyl group, heptyl group, octadecyl group, and the like. Alkyls can be substituted or unsubstituted. When the term is used with the "substituted" modifier, one or more hydrogen atoms has been independently replaced by any of the substituents disclosed herein. In some embodiments, the alkyl group and/or cycloalkyl group is oxygen-free, or does not include any oxygen atoms.

As used herein, the term "heteroalkyl" refers to an alkyl as defined above having at least one carbon atom replaced by a heteroatom. The heteroalkyl group may be monovalent or multivalent. Non-limiting examples of suitable heteroatoms include nitrogen, oxygen, and sulfur. Examples of cycloheteroalkyl groups include, among others, morpholinyl, thiomorpholinyl, pyranyl, imidazolidinyl, imidazolinyl, oxazolidinyl, pyrazolidinyl, pyrazolinyl, pyrrolidinyl, pyrrolinyl, tetrahydrofuranyl, tetrahydrothiophenyl, piperidinyl, piperazinyl, and the like. Heteroalkyls can be substituted or unsubstituted. When the term is used with the "substituted" modifier, one or more hydrogen atoms has been independently replaced by any of the substituents disclosed herein, or a substituent is bonded to a heteroatom, or both. In some embodiments, the heteroalkyl group is oxygen-free, or does not include any oxygen atoms (e.g., does not include any oxygen heteroatoms).

As used herein, the term "alkenyl" refers to a straight- or branched-chain hydrocarbon radical or moiety comprising only carbon and hydrogen atoms and having at least one carbon-carbon double bond, which can be internal or terminal. Non-limiting examples of alkenyl groups include: $—CH{=}CH_2$ (vinyl), $—CH{=}CHCH_3$, $—CH{=}CHCH_2CH_3$, $—CH_2CH{=}CH_2$ (allyl), $—CH_2CH{=}CHCH_3$, $—CH{=}CH—C_6H_5$, $—CH{=}CH—$, $—CH(CH_3)CH_2—$, and $—CH{=}CHCH_2—$. The groups, $—CH{=}CHF$, $—CH{=}CHCl$, $—CH{=}CHBr$, and the like. Examples of alkenyl groups include ethenyl, propenyl, butenyl, pentenyl, hexenyl, butadienyl, pentadienyl, hexadienyl groups, and the like. Alkenyls can be substituted or unsubstituted, monovalent or multivalent. When the term is used with the "substituted" modifier, one or more hydrogen atoms has been independently replaced by any of the substituents disclosed herein. In some embodiments, the alkenyl group is oxygen-free, or does not include any oxygen atoms.

As used herein, the term "aryl" refers to a monocyclic or polycyclic aromatic hydrocarbon radical or moiety comprising only carbon and hydrogen atom, wherein the carbon atoms form an aromatic ring structure. The aryl group may be monovalent or multivalent. If more than one ring is present, the rings may be fused or not fused, or bridged. The term does not preclude the presence of one or more alkyl groups attached to the first aromatic ring or any additional aromatic ring present. The point of attachment can be through an aromatic carbon atom in the ring structure or a carbon atom of an alkyl group attached to the ring structure. Non-limiting examples of aryl groups include phenyl (Ph), tolyl, xylyl, methylphenyl, (dimethyl)phenyl, $—C_6H_4—CH_2CH_3$ (ethylphenyl), naphthyl, and the monovalent group derived from biphenyl. Further examples of aryl groups having only aromatic carbocyclic ring(s) include phenyl, 1-naphthyl (bicyclic), 2-naphthyl (bicyclic), anthracenyl (tricyclic), phenanthrenyl (tricyclic), pentacenyl (pentacyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include benzodioxanyl, benzodioxolyl, chromanyl, indolinyl groups, and the like. When the term is used with the "substituted" modifier, one or more hydrogen atoms has been independently replaced by any of the substituents disclosed herein. In some embodiments, the aryl group is oxygen-free, or does not include any oxygen atoms.

As used herein, the term "heteroaryl" refers to an aryl having at least one aromatic carbon atom in the ring structure replaced by a heteroatom. Non-limiting examples of suitable heteroatoms include nitrogen, oxygen, and sulfur. The term does not preclude the presence of one or more alkyl groups attached to the first aromatic ring or any additional aromatic ring present. The heteroaryl group may be monovalent or multivalent. The point of attachment can be through an aromatic carbon atom or aromatic heteroatom in the aromatic ring structure or a carbon atom of an alkyl group attached to the aromatic ring structure. In some embodiments, the heteroaryl group is oxygen-free, or does not include any oxygen atoms (e.g., does not include any oxygen heteroatoms).

As used herein, the term "heterocyclic" or "heterocyclic group" refers to a monocyclic and/or polycyclic group including one or more heteroatoms. The heterocyclic group may be monovalent or multivalent (e.g., tetravalent), aromatic or non-aromatic, substituted or unsubstituted. In some embodiments, the heterocyclic group is oxygen-free, or does not include any oxygen atoms. For example, in some embodiments, the one or more heteroatoms do not include any oxygen atoms.

As used herein, the term "polycyclic" or "polycyclic group" refers to a ring system including two or more cyclic groups which may be fused, bridged, or otherwise attached to each other. The polycyclic group may be monovalent or multivalent, aromatic or non-aromatic, substituted or unsubstituted. In some embodiments, the polycyclic group is oxygen-free, or does not include any oxygen atoms.

As used herein, the term "polyaromatic" or "polyaromatic group" refers to a group having two or more aromatic groups, which may be fused, bridged, or otherwise attached to each other. The polyaromatic group may be monovalent or multivalent, substituted or unsubstituted. In some embodiments, the polyaromatic group is oxygen-free, or does not include any oxygen atoms.

As used herein, the term "aliphatic" or "aliphatic group" refers to a saturated or unsaturated, linear or branched, cyclic (non-aromatic) or heterocyclic (non-aromatic), hydrocarbon or hydrocarbon group, where each can be substituted or unsubstituted, and encompasses alkyl, alkenyl, and alkynyl groups, and alkanes, alkene, and alkynes, including substituted or unsubstituted groups. An aliphatic group can be monovalent (e.g., —$CH_3$) or multivalent (e.g., bivalent (e.g., —$CH_2$—$CH_2$—)) depending upon the specific structure or formula in which it is used. A multivalent group is one which has two or more carbon-carbon sigma bonds, as compared to one that has only one carbon-carbon sigma bond. In situations where an aliphatic group is used, the number of H present on one or more carbons can be adjusted so that the appropriate bonding scheme can be accomplished (e.g., a carbon may have 3, 2, or 1H in various situations so that the carbon can bond to one, two or three other atoms), where one of skill in the art can determine the appropriate bonding scheme. The term includes alicyclic groups having cyclic structures, which may be monocyclic or polycyclic, substituted or unsubstituted. In some embodiments, the aliphatic group is oxygen-free, or does not include any oxygen atoms.

As used herein, "halogen" or "halide" refers to a fluorine, chlorine, bromine, and iodine, and radicals thereof.

The term "substituted" refers to a molecule or functional group in which one or more hydrogen atoms of a designated atom have been replaced by other atom(s) or groups(s), provided that the normal valence of the designated atom is not exceeded. Each independently selected substituent may be the same or different than other substituents. For example, an R group of a formula may be substituted (e.g., from 1 to 4 times) independently with a halogen, hydroxy, acyl, alkyl, alkenyl, alkynyl, cycloalkyl, heterocyclo, aryl, heteroaryl, alkoxy, amino, amide, thiol, sulfone, sulfoxide, oxy, nitro, carbonyl, carboxy, or amino acid. The term "substituted" in, for example, "substituted alkyl", "substituted aryl", "substituted heteroaryl" and the like, means that the substituted group may contain a group such as alkyl, hydroxy, amino, halo, trifluoromethyl, cyano, —NH(alkyl), —N$(alkyl)_2$, alkoxy, alkylthio, or carboxy in place of one or more hydrogens, and includes haloalkyl, alkoxy, fluorobenzyl, and the sulfur and phosphorous containing substitutions. The term "disubstituted" (e.g., in disubstituted arene) refers to a molecule or functional group in which two hydrogen atoms have be replaced. In some embodiments, the substituent(s) is oxygen-free, or does not include any oxygen atoms.

As used herein, the term "CANAL" refers to the polymer synthesis technique known as catalytic arene-norbornene annulation (CANAL) polymerization and also a building block made by catalytic annulation of two arene-based monomers with a norbornadiene-based monomer. The use of the term CANAL is not intended to limit the arene moiety to a specific aromatic hydrocarbon or the norbornadiene moiety to norbornadiene, and embraces the structures described herein and derivatives thereof, as described in the present disclosure.

As used herein, "Tröger's base" refers to any Tröger's base and/or any derivative thereof. The prototype Tröger's base, 2,8-dimethyl-6H,12H-5,11-methanodibenzo[b,f][1,5]diazocine $(CH_3C_6H_4NCH_2)_2CH_2$) is a tertiary amine, which exhibits chirality due to the presence of two bridgehead stereogenic nitrogen atoms. In some embodiments, a Tröger's base derivative may include more functional groups and/or substituents, or less functional groups and/or substituents relative to a Tröger's base on the phenyl rings. The functional groups and/or substituents optionally may be provided at the same or different positions on the phenyl rings relative to the Tröger's base.

As used herein, "BET", refers to the Brunauer, Emmett, and Teller method for calculating the specific surface area of a sample including the pore size distribution from gas adsorption.

Gas permeation experiments were performed at about 35° C. in a constant volume/variable-pressure apparatus. Pure-gas permeability was calculated according to the following equation:

$$P_i = \frac{V_d l}{P_U TRA}\left(\frac{dp_i}{dt}\right) \quad (3.2.1)$$

where $P_i$ is the pure-gas permeability, $V_d$ is the downstream volume, L is the membrane thickness, $dp_i/dt$ is the steady-state increase in pressure with respect to time, $P_U$ is the upstream pressure, T is the temperature in absolute units, R is the gas constant, and A is the active permeation area. The pure-gas selectivity was calculated as the ratio of the pure-gas permeabilities:

$$\alpha_{A/B} = \frac{P_A}{P_B} \quad (3.2.2)$$

Ultrahigh purity gases were used for permeation and sorption experiments in increasing order of condensability. Oxygen was tested at the end of the series to prevent any chemisorption from taking place in the carbon molecular sieve membranes.

Discussion

Figure 1B:
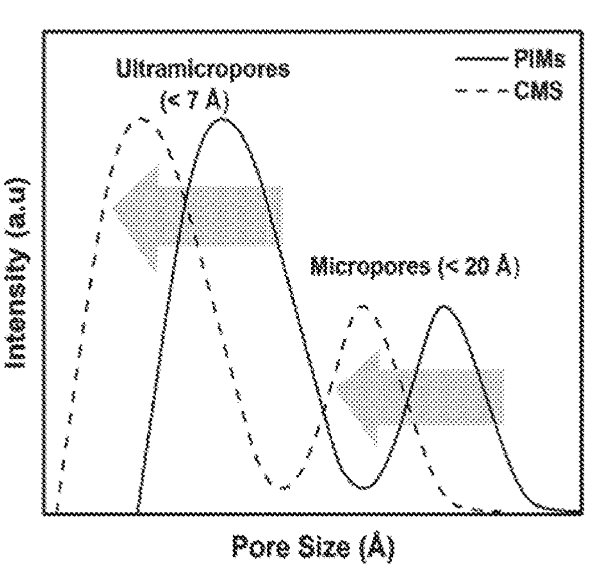

Carbon molecular sieves (CMS) derived from polymers are a class of amorphous inorganic membrane materials. Some CMS membranes may be prepared by controlled thermal treatment of an organic precursor under an essentially inert atmosphere from about 500° C. to about 1200° C. CMS membranes have various advantages, including exceptional chemically stable and the ability to resist high pressures of condensable gases in energy intensive separations. The sieving performance of CMS membranes may be attributed to their high microporosity and narrow pore size distribution. A large fraction of small micropores, often referred to as ultramicropores (pore size <7 Å) and even smaller submicropores (pore size <4 Å) may provide the molecular sieving effect which allows discriminating gas molecules of very similar sizes. For example, the smaller oxygen molecule (kinetic diameter=3.46 Å) may permeate through a CMS membrane faster than nitrogen (kinetic diameter=3.64 Å) by a size selective mechanism, despite a narrow difference in kinetic diameters. Furthermore, CMS membranes also contain a fraction of larger, interconnected micropores (7-20 Å) which provides low diffusion barrier pathways leading to high gas permeability. See, for example, FIGS. 1A-1B.

Certain specific polymers of intrinsic microporosity have been considered for use in the preparation of carbon molecular sieve (CMS) membranes. A primary challenge of these efforts is that CMS membranes prepared from polymers of intrinsic microporosity, while having acceptable gas permeability, have unacceptably low- to moderate gas-pair selectivity. In addition, while some CMS membranes have exhibited suitable gas separation performance for separations involving gas molecules with comparatively large differences in kinetic diameter $CO_2/CH_4$, $H_2/CH_4$, and $O_2/N_2$ separations, CMS membranes capable of separating gas molecules with narrow differences in kinetic diameters—such as for example $H_2/CO_2$, $C_2H_4/C_2H_6$, and $C_3H_6/C_3H_8$ separations—have not yet been realized and therefore further advancement is required to overcome the limitations of conventional polymeric membrane materials. In other words, to achieve the required product purity—which is often for example more than 99% —and provide high recovery, further development of materials with ultra-high size sieving capability is still crucial to advancing the art.

The present invention overcomes these and other challenges by providing improved CMS membranes based on a new class of polymeric precursors. Unlike conventional materials, the CMS membranes disclosed herein are not brittle, easier to handle than conventional materials, and have reproducible gas separation performance. This new class of polymeric precursors includes ladder polymers of intrinsic microporosity having chemical structures that do not include oxygen. The use of oxygen-free ladder polymers of intrinsic microporosity produces CMS membranes with unprecedented gas transport properties and extraordinary gas separation performance. For example, unlike conventional materials, the use of oxygen-free ladder polymers of intrinsic microporosity produces CMS membranes that exhibit both high gas permeability and high gas-pair selectivity, which his unprecedented, making them excellent candidate membrane materials for gas separation processes generally and, in particular, for the most energy-intensive and challenging gas separation applications, such as for example olefin/paraffin separations (e.g., $C_2H_4/C_2H_6$, $C_3H_6/C_3H_8$, etc.), $H_2/CO_2$ separations, and the like. In addition, the use of oxygen-free aromatic ladder polymers of intrinsic microporosity as precursors leads to distinct CMS structures with distinct structures and finely controlled pore formation and sharp pore size cutoffs evidenced by narrow pore size distributions. By applying an oxygen-free precursor, pyrolysis by-products such as CO, $CO_2$ etc. are eliminated during CMS structure formation, thus forming unique CMS membranes with unprecedented gas separation performance.

Embodiments of the present disclosure thus provide carbon molecular sieve membranes based on oxygen-free ladder polymers of intrinsic microporosity. The oxygen-free ladder polymers of intrinsic microporosity may be used as polymeric precursors in the preparation of carbon molecular sieve membranes. For example, pyrolysis and/or heat treatment of an oxygen-free ladder polymer of intrinsic microporosity may be employed to form the carbon molecular sieve membranes of the present disclosure. Accordingly, in some embodiments, the carbon molecular sieve membrane includes the pyrolysis product of an oxygen-free ladder polymer of intrinsic microporosity. The pyrolysis product of an oxygen-free ladder polymer of intrinsic microporosity may include any product (e.g. material or substance) resulting from (e.g., produced by) pyrolysis or heat treatment of an oxygen-free ladder polymer of intrinsic microporosity. For example, in some embodiments, the pyrolysis product of an oxygen-free ladder polymer of intrinsic microporosity includes a pyrolyzed oxygen-free ladder polymer of intrinsic microporosity. In some embodiments, the pyrolysis product of an oxygen-free ladder polymer of intrinsic microporosity includes a heat-treated oxygen-free ladder polymer of intrinsic microporosity.

Suitable oxygen-free ladder polymers of intrinsic microporosity may include polymers having intrinsic microporosity and a backbone that includes fused rings. For example, in some embodiments, the oxygen-free ladder polymers of intrinsic microporosity include a structural group that limits the rotational freedom and/or conformational flexibility of the oxygen-free ladder polymer of intrinsic microporosity. For example, the structural group may include a sterically hindered contortion center or site of contortion that limits the polymer in this way. The structural group may include a rigid or kinked molecular structure that restricts rotation of the polymer backbone and/or prevents efficient packing of polymer chains. Examples of said structural groups, including contortion sites, include, without limitation, spirobisindane, spirobifluorene, ethanoanthracene, tetraphenylethylene, triptycene, arene norbornene, Tröger's base, and derivatives thereof. For example, in some embodiments, the oxygen-free ladder polymer of intrinsic microporosity includes a Tröger's base-derived ladder polymer of intrinsic microporosity. In some embodiments, the oxygen-free ladder polymer of intrinsic microporosity includes a CANAL-derived arene-norbornene ladder polymer of intrinsic microporosity. These shall not be limiting as other structural groups and/or contortion sites may be utilized herein without departing from the scope of the present disclosure, provided that said structural group has a chemical structure that does not include oxygen.

While not wishing to be bound to a theory, it is believed that the size of the contortion site included in the oxygen-free ladder polymer of intrinsic microporosity as well as the oxygen-free pyrolysis/heat treatment protocol (e.g., pyrolysis temperature, pyrolysis atmosphere, soaking time, ramping rate, etc.) used to form the carbon molecular sieve membrane (which is discussed in more detail below) provide different strategies, which may be employed individually or in combination, for fine-tuning various properties of the resulting CMS membranes (e.g., pore size) and/or optimizing their performance for particular gas separation applications. For example, this strategy may be employed to design CMS membranes with enhanced gas-pair selectivity and high gas permeability for highly energy intensive gas separations, as well as other gas separation applications such as those which are not as energy-intensive or challenging. Examples of properties which may be tuned include, without limitation, average pore size, pore size distribution, surface area such as BET surface area, selectivity, permeability, and the like.

In some embodiments, for example, the pore size of the carbon molecular sieves is correlated to the size of the contortion site of the structural group and, being so, may affect the permeability of the resulting carbon molecular sieve membrane. For example, a larger contortion site in the oxygen-free ladder polymer of intrinsic microporosity may form, following heat treatment, a carbon molecular sieve membrane with a larger average pore size—and thus a higher permeability—than another carbon molecular sieve membrane prepared from an oxygen-free ladder polymer of intrinsic microporosity having a smaller contortion site. Accordingly, the oxygen-free ladder polymer of intrinsic microporosity and, in particular, the structural group and/or contortion site included in the oxygen-free ladder polymer of intrinsic microporosity may be varied or selected to adjust the permeability of the resulting carbon molecular sieve membrane following pyrolysis or heat treatment. This is one of the ways in which the use of oxygen-free ladder polymers of intrinsic microporosity provides control over pore formation to obtain carbon molecular sieve membranes with narrow pore size distributions and sharp pore size cutoffs for enhanced gas-pair selectivity and high gas permeability for highly energy-intensive gas separations, among others.

The polymeric precursors used in the preparation of carbon molecular sieve membranes may include any oxygen-free ladder polymer of intrinsic microporosity. In some embodiments, the oxygen-free ladder polymer of intrinsic microporosity includes a Tröger's base-derived ladder polymer of intrinsic microporosity. For example, in some embodiments, the oxygen-free ladder polymer of intrinsic microporosity includes a repeat unit with the structure of formula (I):

(I)

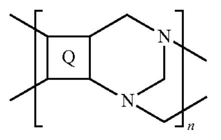

wherein n is at least 1 (e.g., n may range from 1 to about 1,000,000 or greater, or any incremental value or subrange between 1 and the upper range of 1,000,000 or greater) and wherein Q is an optionally substituted oxygen-free tetravalent moiety. In some embodiments, Q is an optionally substituted oxygen-free tetravalent monocyclic or polycyclic moiety. In some embodiments, Q is an optionally substituted oxygen-free tetravalent moiety selected from the following:

(A)

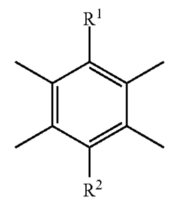

(B)

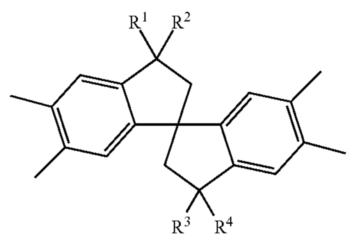

(C)

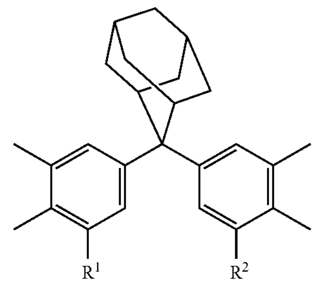

(D)

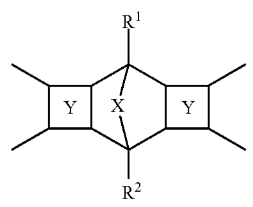

wherein:

$R^1$, $R^2$, $R^3$, and $R^4$ are each independently selected from the group consisting of hydrogen, a substituted or unsubstituted linear or branched alkyl group, a substituted or unsubstituted aryl group, a substituted or unsubstituted heterocyclic group, a halogen group, a nitrile group, a trifluoromethyl group, an amino group, and combinations thereof;

X is a divalent moiety selected from a substituted and unsubstituted alkyl group, a substituted and unsubstituted alkenyl group, a substituted and unsubstituted aryl group, a substituted and unsubstituted polycyclic group, and a substituted and unsubstituted polyaromatic group; and Y is a tetravalent moiety independently selected from a substituted and unsubstituted aryl group, a substituted and unsubstituted heteroaryl group, a substituted and unsubstituted alicyclic group, a substituted and unsubstituted heterocyclic group, a substituted and unsubstituted polycyclic group, and a substituted and unsubstituted polyaromatic group.

In some embodiments, one or more of $R^1$, $R^2$, $R^3$, and $R^4$ are the same. In some embodiments, one or more of $R^1$, $R^2$, $R^3$, and $R^4$ are different.

Examples of the divalent moiety X in formula (D) include, without limitation, the following:

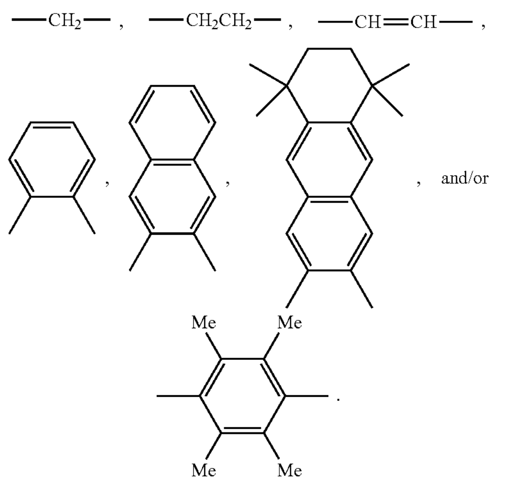

, and/or

Examples of the tetravalent moiety Y in formula (D) include, without limitation, the following:

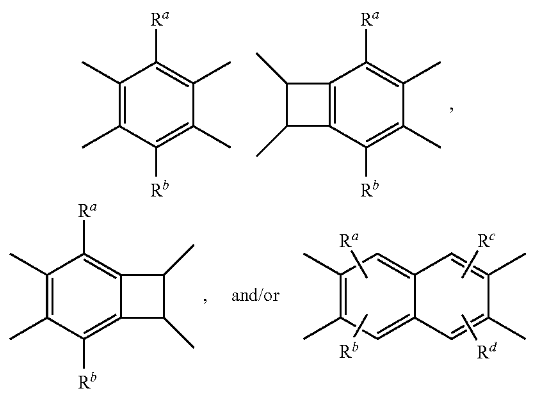

, and/or wherein:

$R^a$, $R^b$, $R^c$, and $R^d$ are independently selected from hydrogen, halogen, a substituted and unsubstituted alkyl group, a substituted and unsubstituted aliphatic group, a substituted and unsubstituted cycloalkyl group, a substituted and unsubstituted aryl group, a substituted and unsubstituted heterocyclic group, groups having a —S— moiety, groups having a —B< moiety, groups having a —N< moiety, groups having a —P< moiety, groups having a —Si≡ moiety, an amino group, and a cyano group. In some embodiments, one or more of $R^a$, $R^b$, $R^c$, and $R^d$ are the same. In some embodiments, one or more of $R^a$, $R^b$, $R^c$, and $R^d$ are different.

In some embodiments, the oxygen-free ladder polymer of intrinsic microporosity includes a CANAL-derived arene-norbornene ladder polymer of intrinsic microporosity. For example, in some embodiments, the oxygen-free ladder polymer of intrinsic microporosity includes a repeat unit with the structure of formula (II):

(II)

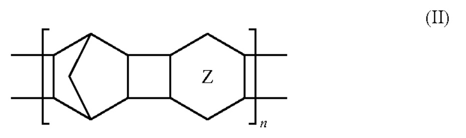

wherein n is at least 1 (e.g., n may range from 1 to about 1,000,000 or greater, or any incremental value or subrange between 1 and the upper range of 1,000,000 or greater) and wherein Z is an optionally substituted oxygen-free tetravalent moiety. In some embodiments, Z is an optionally substituted oxygen-free tetravalent monocyclic or polycyclic moiety. In some embodiments, Z includes one or more of the moieties Q defined above in connection with formula (II). In some embodiments, Z is a tetravalent phenyl group. For example, in some embodiments, the oxygen-free ladder polymer of intrinsic microporosity includes a repeat unit with the structure of formula (IIA):

(IIA)

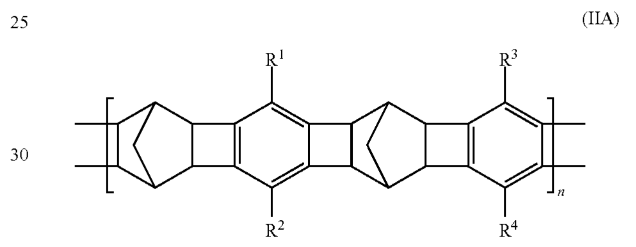

$R^1$, $R^2$, $R^3$, $R^4$, and n are as defined above. In some embodiments, IV and $R^2$ are the same. In some embodiments, $R^3$ and $R^4$ are the same.

Non-limiting examples of specific oxygen-free ladder polymers of intrinsic microporosity suitable for use as precursors in the preparation of carbon molecular sieve membranes include those provided below:

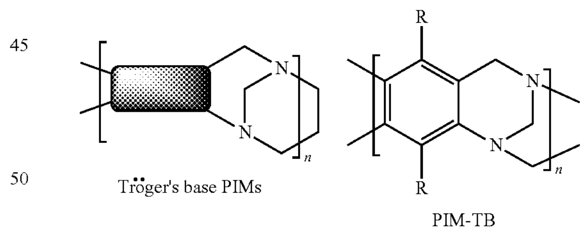

Tröger's base PIMs

PIM-TB

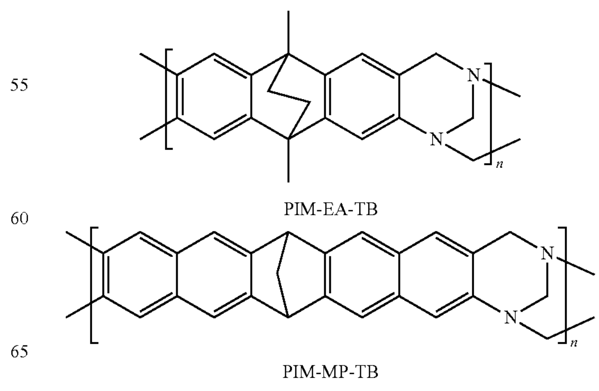

PIM-EA-TB

PIM-MP-TB

-continued

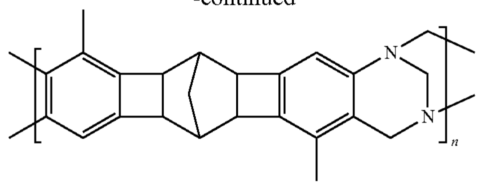

Canal-TB-1

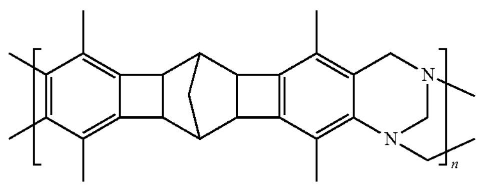

Canal-TB-2

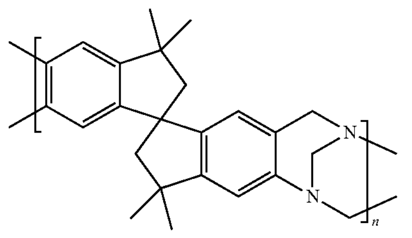

PIM-SBI-TB

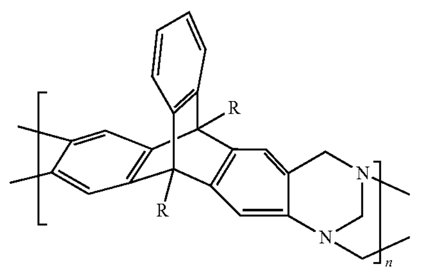

PIM-Trip-TB

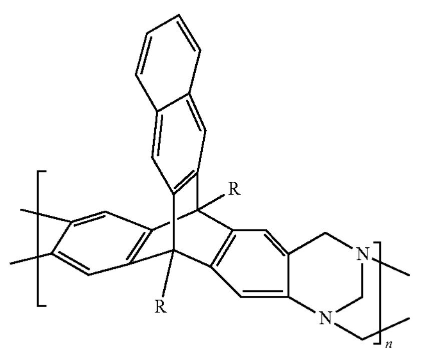

PIM-BTrip-TB

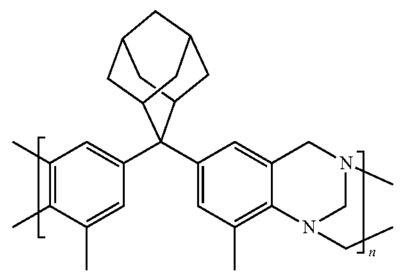

TB-Ad-Me

R,R′ = H, Me, F, Cl, Br, liner alkyl, and branched alkyl

-continued

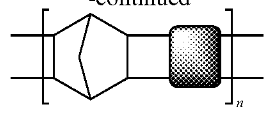

CANAL PIMs

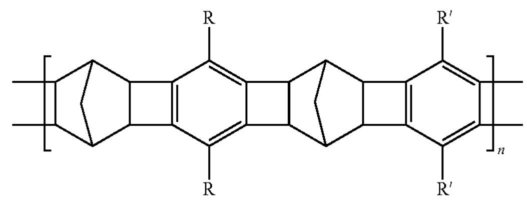

R,R′ = H, Me, F, Cl, Br, liner alkyl, and branched alkyl

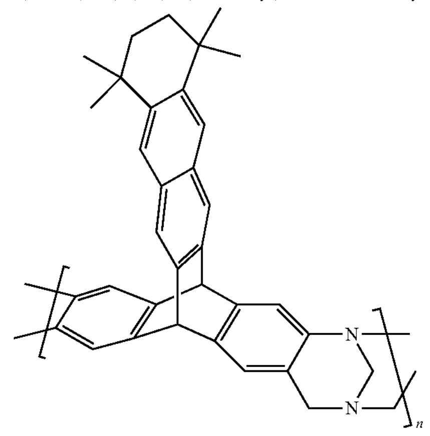

In some embodiments, the average pore size of the carbon molecular sieve membranes ranges from about 0 Å to about 20 Å, or any incremental value or subrange between 0 Å and 20 Å. For example, in some embodiments, the average pore size of the carbon molecular sieve membranes is about 2.60 Angstrom, about 2.65 Angstrom, about 2.75 Angstrom, about 2.89 Angstrom, about 3.17 Angstrom, about 3.20 Angstrom, about 3.30 Angstrom, about 3.40 Angstrom, about 3.50 Angstrom, about 3.73 Angstrom, about 3.76 Angstrom, about 3.46 Angstrom, about 3.60 Angstrom, about 3.64 Angstrom, about 3.80 Angstrom, about 3.90 Angstrom, about 3.96 Angstrom, about 4.00 Angstrom, about 4.30 Angstrom, about 4.50 Angstrom, about 5.50 Angstrom, about 5.85 Angstrom, about 5.90 Angstrom, about 6.80 Angstrom, about 7.50 Angstrom, or about 8.50 Angstrom.

In some embodiments, the pyrolysis product includes an oxygen-free ladder polymer of intrinsic microporosity subjected to heat treatment at a pyrolysis temperature in the range of about 500° C. to about 1200° C., or any incremental pyrolysis temperature or subrange of temperatures between (and including) 500° C. and 1200° C. For example, in some embodiments, the pyrolysis product includes a 500° C.-pyrolyzed oxygen-free ladder polymer of intrinsic microporosity, 550° C.-pyrolyzed oxygen-free ladder polymer of intrinsic microporosity, 600° C.-pyrolyzed oxygen-free ladder polymer of intrinsic microporosity, 650° C.-pyrolyzed oxygen-free ladder polymer of intrinsic microporosity, 700° C.-pyrolyzed oxygen-free ladder polymer of intrinsic microporosity, 750° X-pyrolyzed oxygen-free ladder polymer of intrinsic microporosity, 800° C.-pyrolyzed oxygen-free ladder polymer of intrinsic microporosity, 850° C.-pyrolyzed oxygen-free ladder polymer of intrinsic microporosity, 900° C.-pyrolyzed oxygen-free ladder polymer of intrinsic microporosity, 950° C.-pyrolyzed oxygen-free ladder polymer of intrinsic microporosity, 1000° C.-pyrolyzed oxygen-free ladder polymer of intrinsic microporosity, 1050° C.-pyrolyzed oxygen-free ladder polymer of intrinsic microporosity, 1100° C.-pyrolyzed oxygen-free ladder polymer of intrinsic microporosity, 1150° C.-pyrolyzed oxygen-free ladder polymer of intrinsic microporosity, 1200° C.-pyrolyzed oxygen-free ladder polymer of intrinsic microporosity, etc. These shall not be limiting as the oxygen-free ladder polymer of intrinsic microporosity may be subjected to pyrolysis at any temperature in the range of 500° C. and 1200° C., inclusive.

In some embodiments, the oxygen-free ladder polymer of intrinsic microporosity includes one or more of CANAL-TB-1, CANAL-TB-2, PIM-EA-TB, PIM-ET-TB-2, PIM-Trip-TB, PIM-Trip-TB-2, PIM-BTrip-TB, PIM-BTrip-TB-2, PIM-MP-TB, PIM-TMN-Trip-TB, PIM-SBI-TB, TB-Ad-Me, PIM-TB, CANAL-PIMs, derivatives thereof, and the like.

In some embodiments, the oxygen-free ladder polymers of intrinsic microporosity disclosed herein are rigid, solution processible polymers with high Brunauer-Emmett-Teller (BET) surface area, for example, BET surfaces areas of at least 200 $m^2$ $g^{-1}$.

In some embodiments, the carbon molecular sieve membranes may have the form of a film, a thin film, a hollow fiber, a flat sheet, a cylindrical shape. These shall not be limiting as other geometries and forms are permitted without departing from the scope of the present invention.

Embodiments of the present disclosure further describe polymeric precursors for CMS membranes including an oxygen-free ladder polymer of intrinsic microporosity. Any of the oxygen-free ladder polymers of intrinsic microporosity may be utilized herein without departing from the scope of the present invention.

Figure 2:
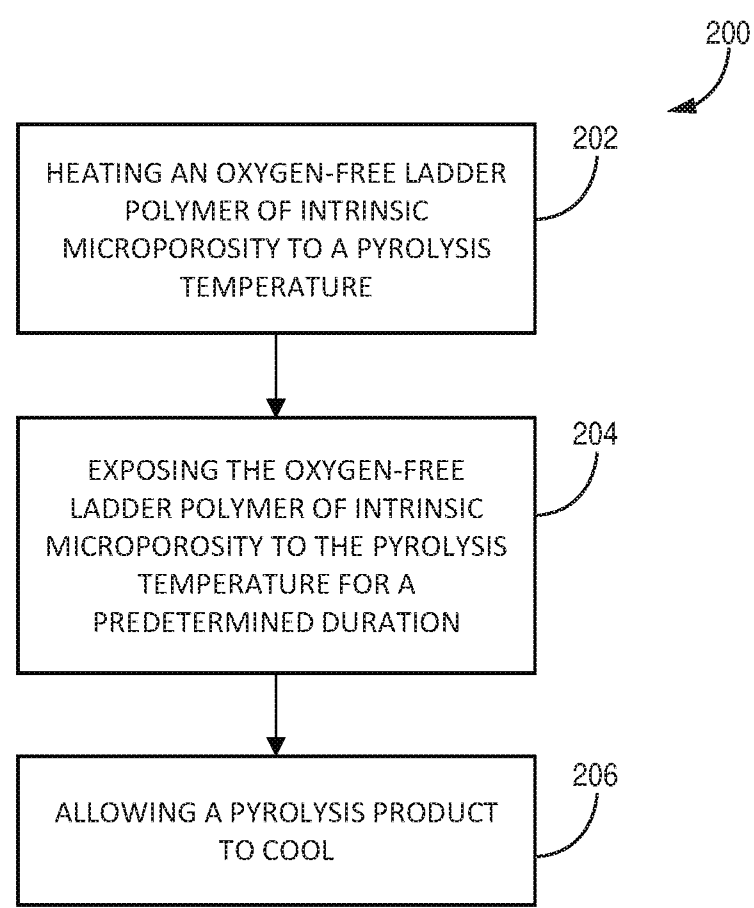
FIG. 2 is a flowchart of a pyrolysis protocol used for preparing a carbon molecular sieve membrane, according to one or more embodiments of the invention.

FIG. 2 is a flowchart of a pyrolysis protocol used for preparing a carbon molecular sieve membrane, according to one or more embodiments of the invention. As shown in FIG. 2, the pyrolysis protocol may include one or more of the steps 202 to 206. In some embodiments, the method includes heating 202 an oxygen-free ladder polymer of intrinsic microporosity to a pyrolysis temperature in an oxygen-free atmosphere to form, optionally without producing any oxygen-containing gas, a pyrolysis product. In some embodiments, the pyrolysis protocol includes heating 202 an oxygen-free ladder polymer of intrinsic microporosity to a pyrolysis temperature in an oxygen-free pyrolysis atmosphere. The oxygen-free ladder polymer of intrinsic microporosity may include any of the oxygen-free ladder polymers of intrinsic microporosity disclosed herein. In some embodiments, one or more of X and Y from the repeat unit with the structure of formula (I) and/or Z from the repeat unit with the structure of formula (II) may be selected or varied to control, modify, or tune the pore size, formation of pores, etc. of the pyrolysis product and/or resulting carbon molecular sieve. For example, in some embodiments, the pore size of the CMS membrane and/or pyrolysis product increases as the bulkiness (e.g., type and number of substituents, degree of branching, number of fused rings, etc.) of the X, Y, and Z groups increases.

The heating may be performed at a temperature ramp rate (e.g., a heating rate) ranging from about 1° C. $s^{-1}$ to about 1° C. $h^{-1}$, or any rate therebetween. For example, in some embodiments, the heating is performed at a temperature ramp rate between 1° C. $min^{-1}$ and 5° C. $min^{-1}$, such as about 3° C. $min^{-1}$, at least until the pyrolysis temperature is reached. The pyrolysis temperature may range from about 500° C. to about 1200° C., or any incremental temperature or subrange of temperatures between 500° C. and 1200° C. For example, in some embodiments, the pyrolysis temperature is in the range of about 500° C. to about 900° C., such as about 500° C., about 600° C., about 700° C., about 800° C., or about 900° C. The heating may be performed in a furnace (e.g., a tube furnace), an oven, or any other suitable heating apparatus. In one embodiment, a Carbolite three-zone tube furnace is used.

As mentioned above, the heating may be performed in a pyrolysis atmosphere which is optionally oxygen-free. For example, in some embodiments, the heating is performed in an oxygen-free pyrolysis atmosphere. The oxygen-free pyrolysis atmosphere may include one or more additional inerts, such as for example nitrogen, helium, argon, hydrogen, and the like, provided that $O_2$ is not present, or only present in negligible or trace amounts. In one embodiment, for example, the heating is performed under an inert flow of nitrogen at a flow rate of about 1000 $cm^3$ (STP) $min^{-1}$. Upon reaching the pyrolysis temperature, the oxygen-free ladder polymer of intrinsic microporosity may be held isothermally at said pyrolysis temperature for a predetermined duration. The duration is not particularly limited and may range from about 1 second to about 24 hours. In some embodiments, the duration is between 50 min and 70 min, such as about 60 min. In some embodiments, the step of holding the temperature at the pyrolysis temperature may be referred to as an isothermal soak.

In some embodiments, the heating of the oxygen-free ladder polymer of intrinsic microporosity, optionally in an oxygen-free pyrolysis atmosphere, proceeds in the absence of (e.g., does not involve) any conventional combustion reactions. For example, in some embodiments, the heating of the oxygen-free ladder polymer of intrinsic microporosity eliminates the production (e.g., release) of products (e.g., byproducts) such as carbon monoxide, carbon dioxide, and other oxygen-containing products. In this way, the method minimizes complications of the pyrolysis process, providing a less dangerous and more controllable process for the preparation of carbon molecular sieve membranes with outstanding gas separation performance, including high permeability and high gas-pair selectivity, among other things. In some embodiments, no oxygen-containing compounds are evolved and/or produced during the heating of the oxygen-free ladder polymer of intrinsic microporosity to the pyrolysis temperature.

After exposing 204 the oxygen-free ladder polymer of intrinsic microporosity to the pyrolysis temperature for the predetermined duration, the substance formed may be allowed to cool 206 to a second temperature. In some embodiments, for example, the substance is removed from the heating apparatus, or the heating apparatus is turned off, and the substance is allowed to cool to about room temperature (e.g., about 25° C., or any temperature between about 20° C. and 30° C.) and/or for a select duration which include durations of about 600 min or less. In some embodiments, the substance remaining after the isothermal soak includes, or is referred to as, the pyrolysis product of the oxygen-free ladder polymer of intrinsic microporosity. In some embodiments, the substance remaining after the isothermal soak and after said substance is allowed to cool to about room temperature includes, or is referred to, as the pyrolysis product of the oxygen-free ladder polymer of intrinsic microporosity. In other words, the heating alone, or the heating in combination with the cooling, may form the pyrolysis product of the oxygen-free ladder polymer of intrinsic microporosity and accordingly the carbon molecular sieve membrane.

In some embodiments, one or more parameters may be adjusted to tune one or more properties of the carbon molecular sieve membrane. The one or more properties may include, without limitation, one or more of pore size, pore size distribution (e.g., more uniform or less uniform pore size distributions and/or pore sizes), pore formation, membrane structure, pore channel structure, membrane thickness, selectivity, permeability, surface are (e.g., BET surface area), and the like, wherein tuning of one or more of these and other properties may be used to target specific gas separations. In some embodiments, the method 200 includes adjusting one or more of X and Y from the repeat unit with the structure of formula (I) to tune one or more properties of the carbon molecular sieve membrane. In some embodiments, the method 200 further includes adjusting Z from the repeat unit with the structure of formula (II) to tune one or more properties of the carbon molecular sieve membrane. In some embodiments, the method 200 further includes adjusting a pyrolysis temperature to tune one or more properties of the carbon molecular sieve membrane. In some embodiments, the method 200 further includes adjusting a pyrolysis atmosphere (e.g., the chemical species, such as the inerts, present in the pyrolysis atmosphere) to tune one or more properties of the carbon molecular sieve membrane. In some embodiments, the method 200 further includes adjusting the temperature ramp rate (e.g., the heating rate) to tune one or more properties of the carbon molecular sieve membrane. In some embodiments, the method 200 further includes adjusting the isothermal soak (e.g., duration of holding the polymeric precursor at a select temperature or select temperature range) to tune one or more properties of the carbon molecular sieve membrane.

In some embodiments, for example, the pyrolysis process may be used to tune the interchain spacing or distance between polymer chains (e.g., the pore size). In some embodiments, the pyrolysis process may be used to minimize the broad pore size distribution of the pyrolysis product to obtain carbon molecular sieve membranes with sharp pore size cutoffs. For example, carbon molecular sieve membranes with very narrow and/or sharp pore size distributions may be achieved to achieve unprecedented gas separation performance in energy-intensive separations including, for example and without limitation, $H_2/CO_2$ separations, ethylene/ethane separations, propylene/propane separations, and the like.

Figure 3:
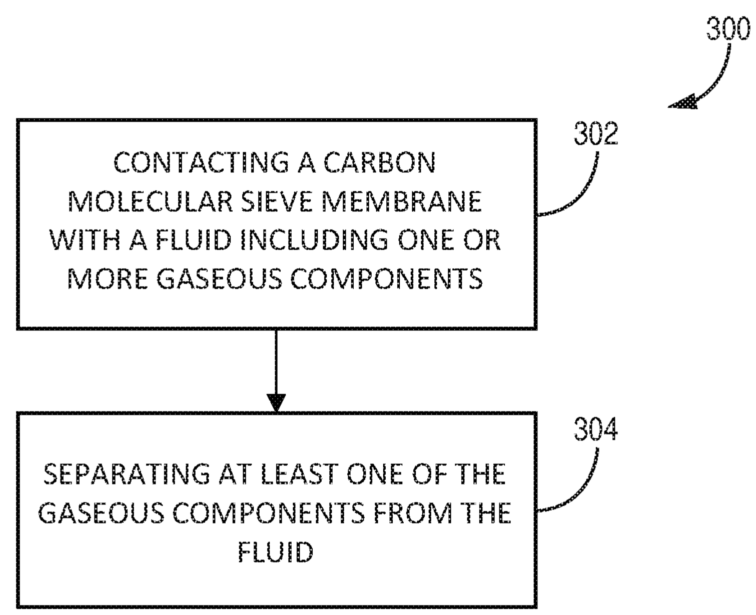
FIG. 3 is a flowchart of a method of gas separation, according to one or more embodiments of the invention.

FIG. 3 is a flowchart of a method of gas separation according to one or more embodiments of the invention. As shown in FIG. 3, the method may include one or more of the following steps: contacting 302 a carbon molecular sieve membrane with a fluid including one or more gaseous components and separating 304 at least one of the gas components from the fluid. The contacting may proceed by one or more of feeding, flowing, passing, injecting, and/or introducing the fluid to the carbon molecular sieve membrane. The separating may include separating at least one of the gas components from a bulk or from a specific chemical species or group thereof. In some embodiments, the separating can result in the production of a retentate stream having a reduced concentration of at least one species and a permeate stream having an increased concentration of that species. For example, in some embodiments, at least one of said gas components permeates through the carbon molecular sieve membrane.

The carbon molecular sieve membrane may be used for a wide array of separations. As mentioned above, for example, in some embodiments, the carbon molecular sieve membranes are used in energy-intensive and/or challenging gas separation applications including, for example and without limitation, ethylene and ethane, propylene and propane, $CO_2$ and $H_2$, and the like. At least one advantage of the carbon molecular sieve membranes disclosed herein is that they may be utilized in the most energy-intensive and challenging gas separation applications. For example, gas separation applications involving gas components, or gas molecules, with narrow differences in kinetic diameter usually have high energy requirements and thus correspondingly high operating costs. The narrow pore size distribution and/or sharp pore size cutoff of the carbon molecular sieve membranes disclosed herein confer high gas-pair selectivity for gas pairs having narrow differences in kinetic diameter.

The carbon molecular sieve membranes may be utilized for gas separation applications involving gas molecules with narrow differences in kinetic diameter. For example, in some embodiments, the carbon molecular sieve membranes may be used in gas separation applications in which the difference in kinetic diameter of the gas molecules to be separated is less than or about 2.00 Å, less than or about 1.90 Å, less than or about 1.80 Å, less than or about 1.70 Å, less than or about 1.60 Å, less than or about 1.50 Å, less than or about 1.40 Å, less than or about 1.30 Å, less than or about 1.20 Å, less than or about 1.10 Å, less than or about 1.00 Å, less than or about 0.95 Å, less than or about 0.90 Å, less than or about 0.85 Å, less than or about 0.80 Å, less than or about 0.75 Å, less than or about 0.70 Å, less than or about 0.65 Å, less than or about 0.60 Å, less than or about 0.55 Å, less than or about 0.50 Å, less than or about 0.45 Å, less than or about 0.40 Å, less than or about 0.35 Å, less than or about 0.30 Å, less than or about 0.25 Å, less than or about 0.20 Å, less than or about 0.15 Å, less than or about 0.10 Å, less than or about 0.05 Å, less than or about 0.04 Å, less than or about 0.03 Å, less than or about 0.02 Å, less than or about 0.01 Å, or any incremental value or subrange between 0 Å and 5.00 Å.

The carbon molecular sieve membranes may be used in other types of applications. For example, in some embodiments, the carbon molecular sieve membranes may be used in applications including, but are not limited to, one or more of separating oxygen and/or nitrogen from air, $CO_2$ capture from flue gas, propane/propene separation, hydrogen purification, hydrogen recovery from refinery fuel gas and exhaust gas, methane enrichment, acid gas removal from natural gas, dehydration processes, and the like. In some embodiments, the carbon molecular sieve membranes are used for the separation of specific gases including, but not limited to, one or more of $H_2$ and $CO_2$, $C_2H_4$ and $C_2H_6$, $C_3H_6$ and $C_3H_8$, $CO_2$ and $CH_4$, $H_2S$ and $CH_4$, $CO_2$ and $H_2S$ and $CH_4$, $CO_2$ and $N_2$, $O_2$ and $N_2$, $N_2$ and $CH_4$, He and $CH_4$, $H_2$ and $CH_4$, $H_2$ and $C_2H_4$, ethylene and ethane, propylene and propane, ethylene/propylene, and ethane/propane, among others. In some embodiments, the fluid includes one or more of biogas, natural gas, refinery off gas, and the like. In some embodiments, the fluid includes one or more of $H_2$, He, $CH_4$, $NH_3$, $H_2O$, Ne, $N_2$, CO, NO, $O_2$, $H_2S$, HCl, Ar, $CO_2$, $N_2O$, and $SO_2$.

EXAMPLES

The Examples demonstrate an enhancement in the performance of carbon molecular sieve membranes prepared from polymeric precursors including oxygen-free ladder polymers of intrinsic microporosity. As demonstrated herein, the CMS membranes may be fined tuned with a desired pore size by varying or adjusting one or more of (a) the size of the contortion site in the polymeric precursor and (b) the parameters of the pyrolysis protocol which include, without limitation, the pyrolysis temperature, the pyrolysis atmosphere, the heating rate or temperature ramping rate, and/or soaking time (e.g., isothermal soaking time), among others. This strategy may be utilized to design optimized ladder polymers of intrinsic microporosity to produce CMS membranes with the required pore size and/or pore size distribution for enhanced gas-pair selectivity and high gas permeability for highly energy intensive separations. Four precursors with different contortion sites were evaluated—namely, CANAL-TB-1, PIM-ET-TB-2, PIM-Trip-TB-2, and PIM-BTrip-TB-2—to assess the impact of systematically varied contortion sites on the structure and gas separation performance of the CMS membranes. Preliminary gas transport results of the CMS membranes, including CANAL-TB-1-based CMS membranes and Trip-TB-2-based CMS membranes, show unprecedented performance for $H_2/CO_2$ and $C_2H_4/C_2H_6$ separations, respectively.

Example 1

General Pyrolysis Protocol for CMS Membrane Formation

Figure 4:
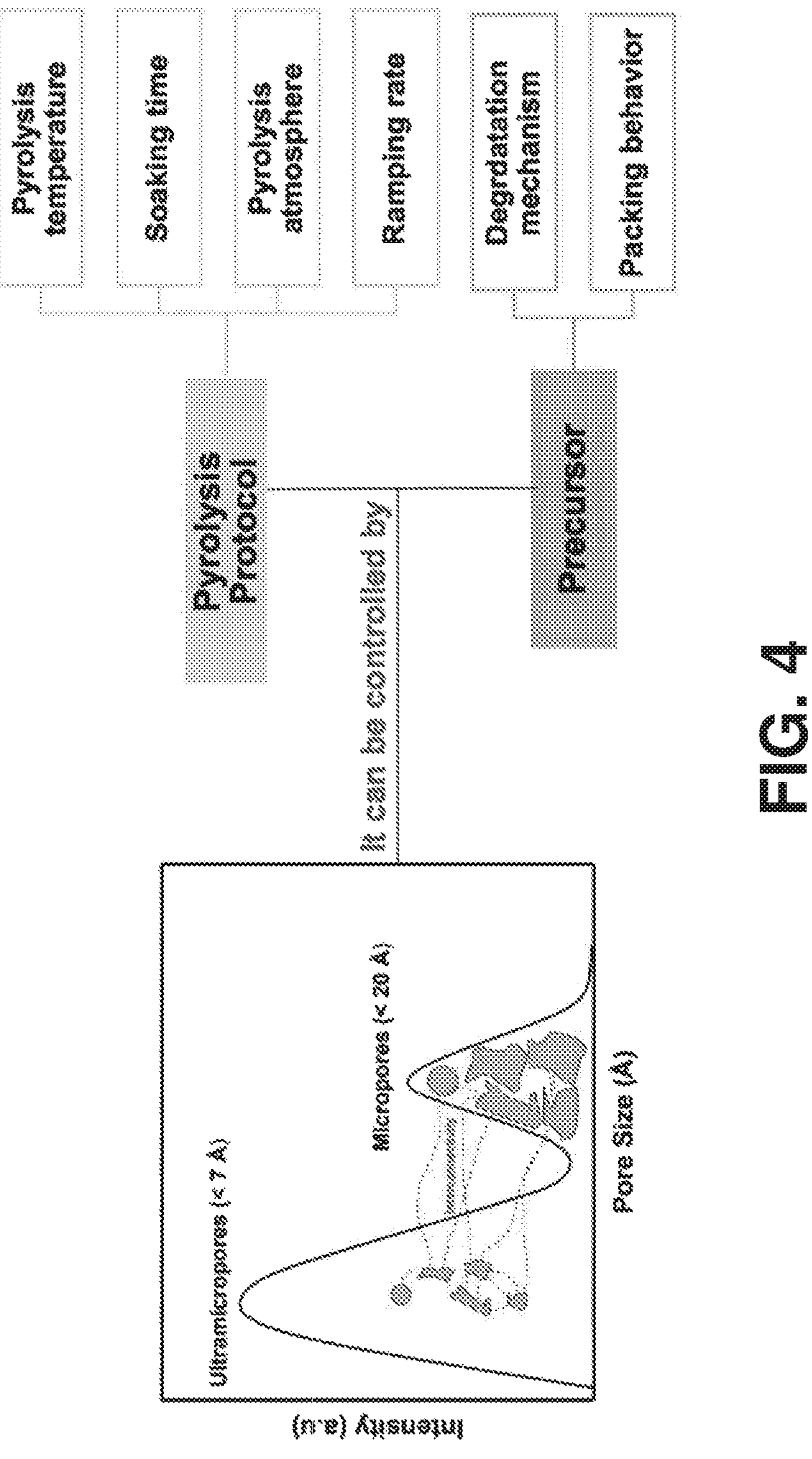
FIG. 4 is a schematic diagram illustrating the main factors affecting the sizes, size distribution and the interconnectivity of the CMS membrane pores, according to one or more embodiments of the invention.

The performance of CMS membranes depends entirely on the sizes, size distribution and the interconnectivity of its pores, although full control and design of these three structural properties of CMS membranes remains limited. In the preparation of the CMS membranes disclosed herein, the pyrolysis protocol and the polymer precursor type were treated as the two primary factors affecting the separation performance of CMS membranes (FIG. 4). The pyrolysis protocol, for example, may include without limitation the pyrolysis temperature ($T_p$), the heating rate, the soaking time, and the pyrolysis atmosphere. On the other hand, the effects of the selection of the polymeric precursors on the structure and performance of the CMS membrane have not been studied in any systematic series of related polymers, specifically polymers of intrinsic microporosity. Accordingly, this was at least a part of the focus of the present examples.

Figure 5A:
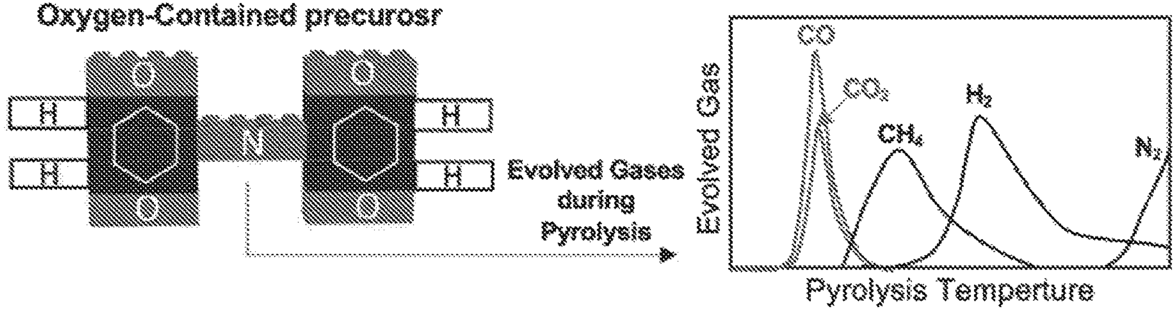
FIGS. 5A-5B are schematic diagrams illustrating evolved gases during pyrolysis of two precursor types in which (A) the top one is an oxygen-contained precursor, wherein the mass spectroscopy represents the gases evolved during degradation of Kapton polyimide, and (B) the bottom one is an oxygen-free precursor which is the subject of the present disclosure, according to one or more embodiments of the invention.
Figure 5B:
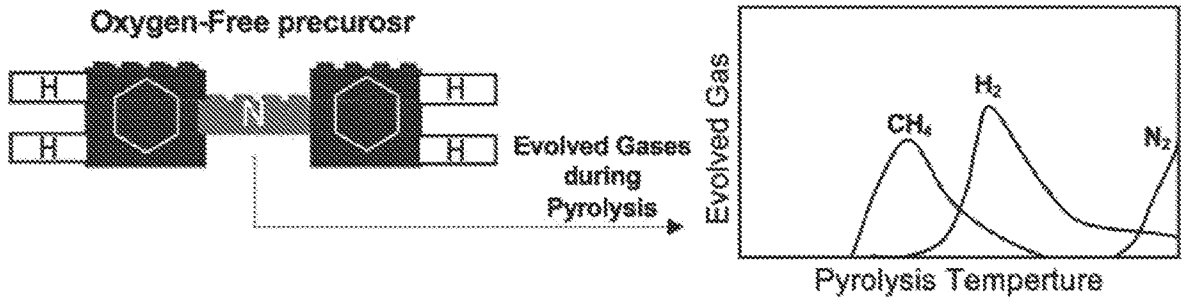
Figures 6A, 6B, 6C, 6D:
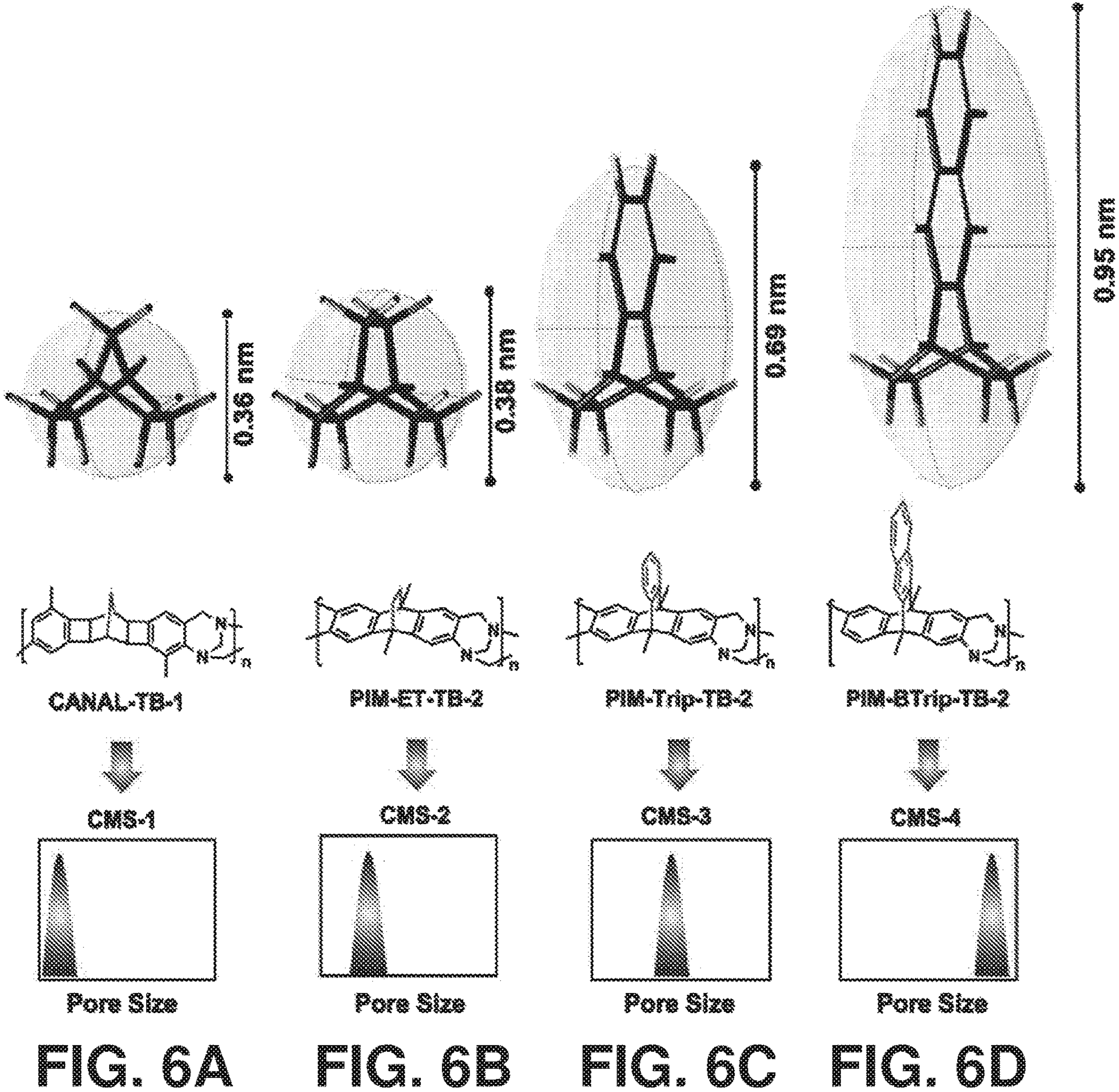
FIGS. 6A-6D is a schematic diagram including the chemical structures of various polymeric precursors including oxygen-free ladder polymers of intrinsic microporosity and graphical views of each showing the effect of the site of contortions on the CMS membrane pore size—the larger the contortion site, the bigger the finely tuned pores, according to one or more embodiments of the invention.

More specifically, the effect of the pyrolysis protocol and the contortion site of oxygen-free ladder polymers of intrinsic microporosity precursors on the CMS membrane performance was evaluated. The conclusions included: (1) that the use of oxygen-free aromatic PIM-based precursors leads to distinct CMS structures with more controlled pore formation. At least one advantage of applying an oxygen-free precursor is that conventional combustion reactions are eliminated (e.g., release of CO and $CO_2$ etc.), thus minimizing complications of the pyrolysis process (FIGS. 5A-5B). This is the first report of a process that essentially eliminated the presence of oxygen (internal=polymer structure and external=pyrolysis atmosphere) during the pyrolysis events. Another conclusion included that (2) larger contortion sites in the pristine polymer lead to the generate of larger average pore size in the CMS membranes (FIGS. 6A-6D).

Figure 7:
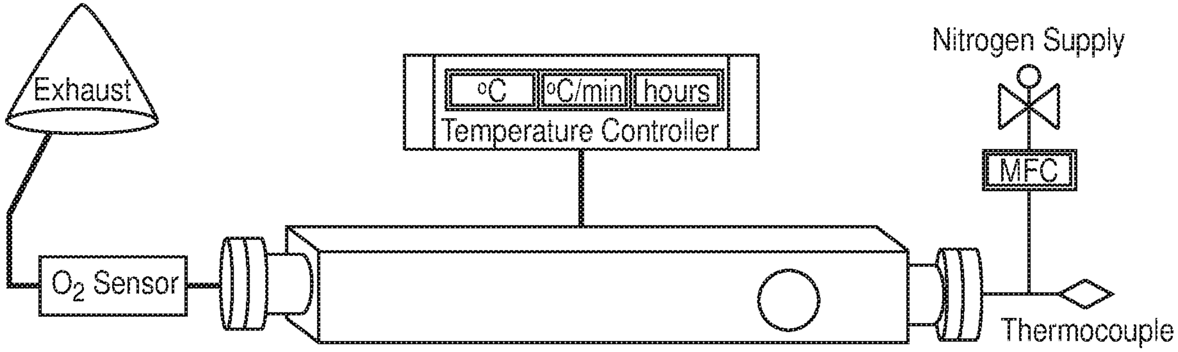
FIG. 7 a schematic diagram of the three-zone pipe furnace with oxygen sensor for polymeric pyrolysis, according to one or more embodiments of the invention.
Figure 8:
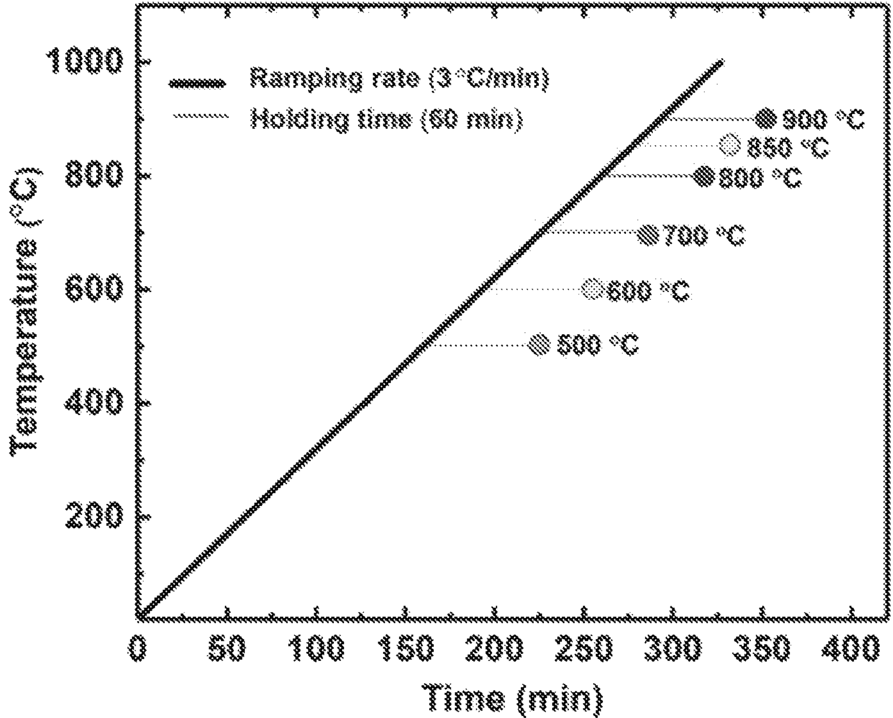
FIG. 8 is a graphical view illustrating the heating protocol employed in the fabrication of CMS membranes prepared from oxygen-free ladder polymers of intrinsic microporosity, according to one or more embodiments of the invention.
Figure 9:
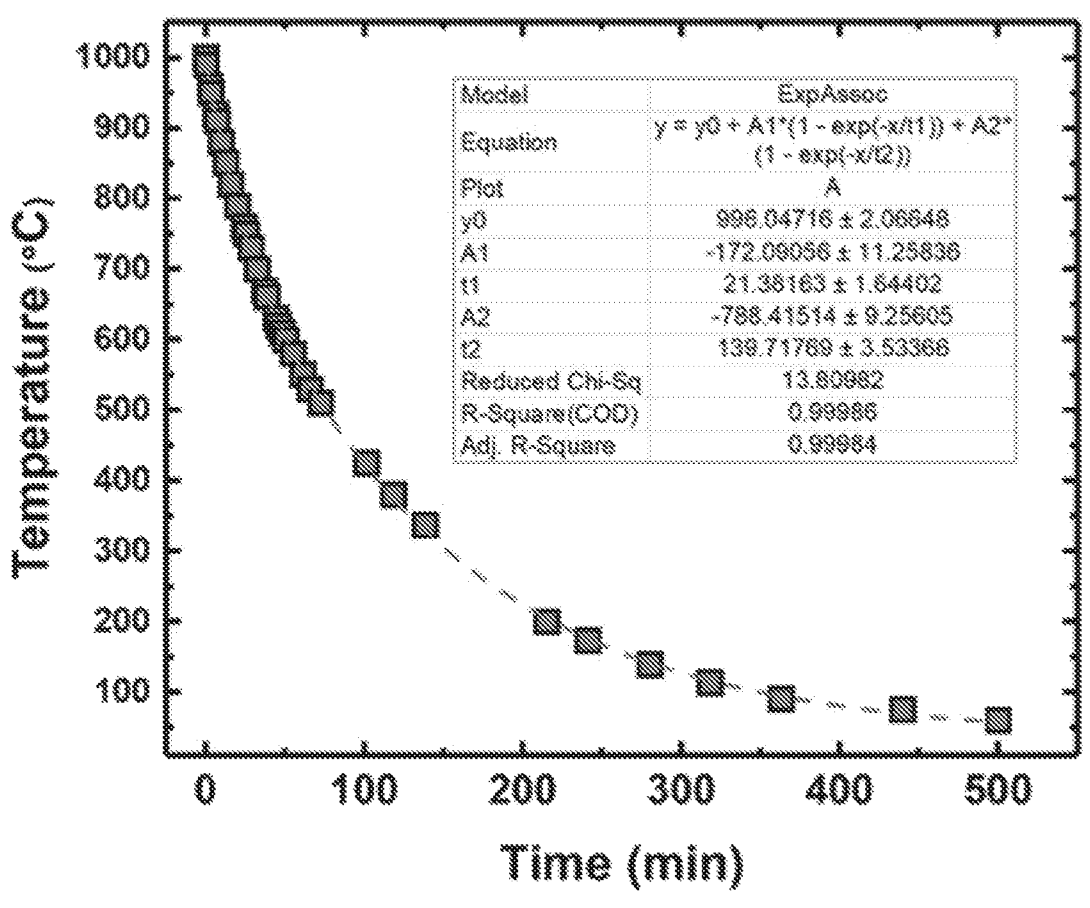
FIG. 9 is a graphical view illustrating the cooling protocol employed in the fabrication of CMS membranes, after pyrolysis, prepared from oxygen-free ladder polymers of intrinsic microporosity, according to one or more embodiments of the invention.

In general, to prepare the CMS membranes, a polymeric precursor including an oxygen-free ladder polymer of intrinsic microporosity was placed inside a Carbolite three-zone tube furnace supplied with 1000 $cm^3$ (STP) $min^{-1}$ of $N_2$ (FIG. 7). The temperature was measured with a thermocouple adjacent to the sample. The concentration of oxygen in the furnace was measured with a Cambridge Sensotec Rapidox 3100 $O_2$ analyzer and did not exceed 2 ppm. The polymeric precursor was heated at a ramp rate of 3° C. $min^{-1}$ to set point temperatures (e.g., pyrolysis temperatures) between 500 to 900° C. and then held isothermally at the set point temperature for about 60 min (FIG. 8). After the isothermal soak, the furnace was allowed to passively cool to about room temperature (e.g., about 25° C.) (FIG. 9). The gas permeation properties of the membranes were tested immediately upon removal from the furnace and cooling to room temperature.

Example 2

Separation Performance of CANAL-TB-1 Based CMS Membranes

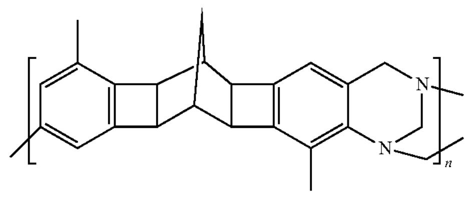

CANAL-TB-1

Gas permeability measurements and selectivity measurements of pristine and CANAL-TB-1 based CMS membranes, which were heat-treated at different pyrolysis temperatures, were carried out. The pure gas permeabilities and ideal gas-pair selectivities of the CANAL-TB-1 based carbon membranes are reported in Table 1. The pristine CANAL-TB-1 exhibited the highest permeability for all gases but the lowest selectivity—due to the broad pore size distribution in the pristine non-pyrolyzed polymer. The 500° C.-CANAL-TB-1 based CMS membrane exhibited a drastic drop in the gas permeability, but a significant increase in selectivity. The decrease in permeability may be due to the loss of both main chain bridge contortion sites (e.g., norbornane and Tröger's base). The 600° C.- and 700° C.-CANAL-TB-1 based CMS membranes showed high rejection of methane (d=3.8 Å), indicating an extreme shift in pore size distribution towards smaller pores, resulting in extremely high selectivity for $H_2/CH_4$ and $CO_2/CH_4$. At higher pyrolysis temperatures of 800 to 900° C., the pore size continued to decrease, which was clearly indicated by the dramatic reduction in $CO_2$ permeability and boost in selectivity.

Figure 10B:
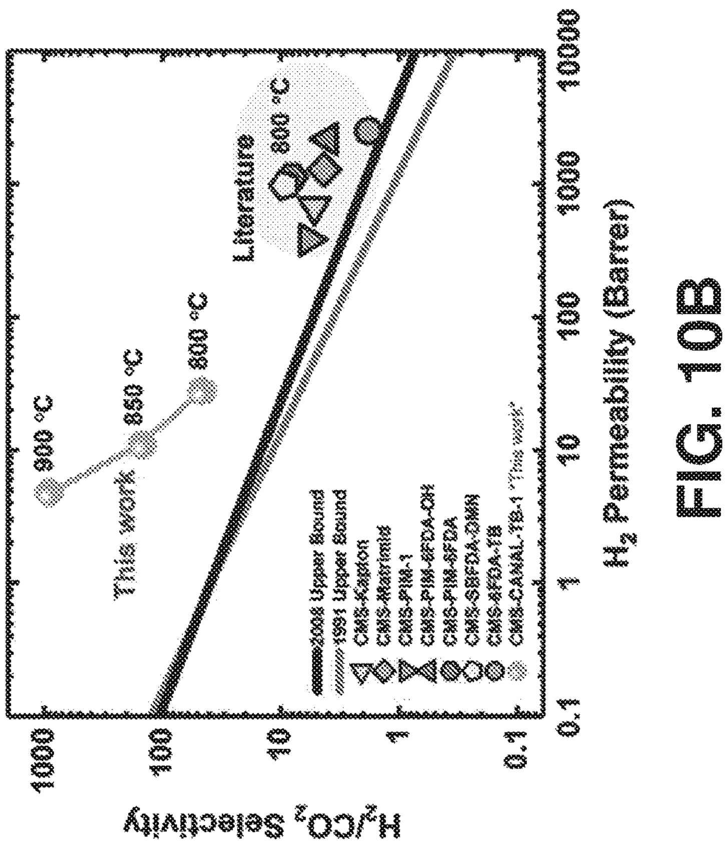
FIGS. 10A-10B are graphical views showing (a) $H_2/CO_2$ separation performance of the CANAL-TB-1 pristine and its heat-treated derivatives; and (b) a comparison of the $H_2/CO_2$ performance of the 800 to 900° C. heat-treated CANAL-TB-1 based CMS membranes to previously reported CMS membranes in the literature, according to one or more embodiments of the invention.
Figure 10A:
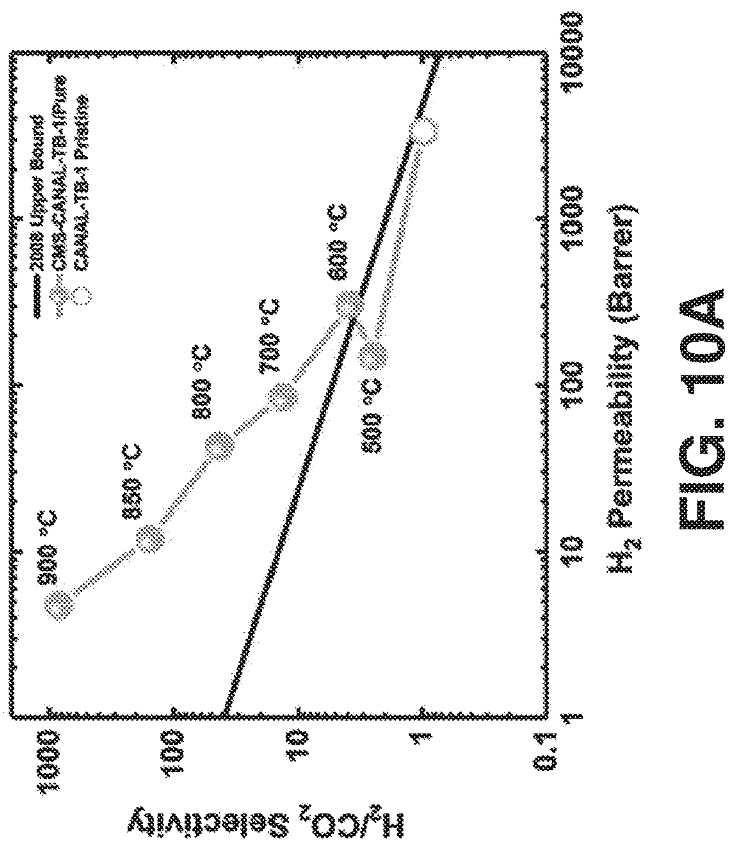

The gas separation properties of CMS membranes prepared from CANAL-TB-1 as a function of pyrolysis temperature are shown in FIG. 10A and compared to conventional state-of-the-art CMS membranes in FIG. 10B. In particular, FIG. 10A is a graphical view showing $H_2/CO_2$ separation performance of pristine CANAL-TB-1 and heat-treated derivatives of CANAL-TB-1, according to one or more embodiments of the invention. FIG. 10B is a graphical view showing a comparison of the $H_2/CO_2$ performance of previously reported conventional CMS membranes to CMS membranes of the present disclosure which were prepared by pyrolysis of CANAL-TB-1 at temperatures in the range of 800° C. to 900° C., according to one or more embodiments of the invention. CANAL-TB-1 based CMS membranes demonstrated unprecedented performance for $H_2/CO_2$ separation, well above the 2008 polymeric upper bound as shown in FIG. 10A and better than any other reported CMS membranes, as shown in FIG. 10B, placing the CANAL-TB-1 based CMS membranes as the currently best performing state-of-the-art membranes for $H_2/CO_2$ separation.

Figure 11:
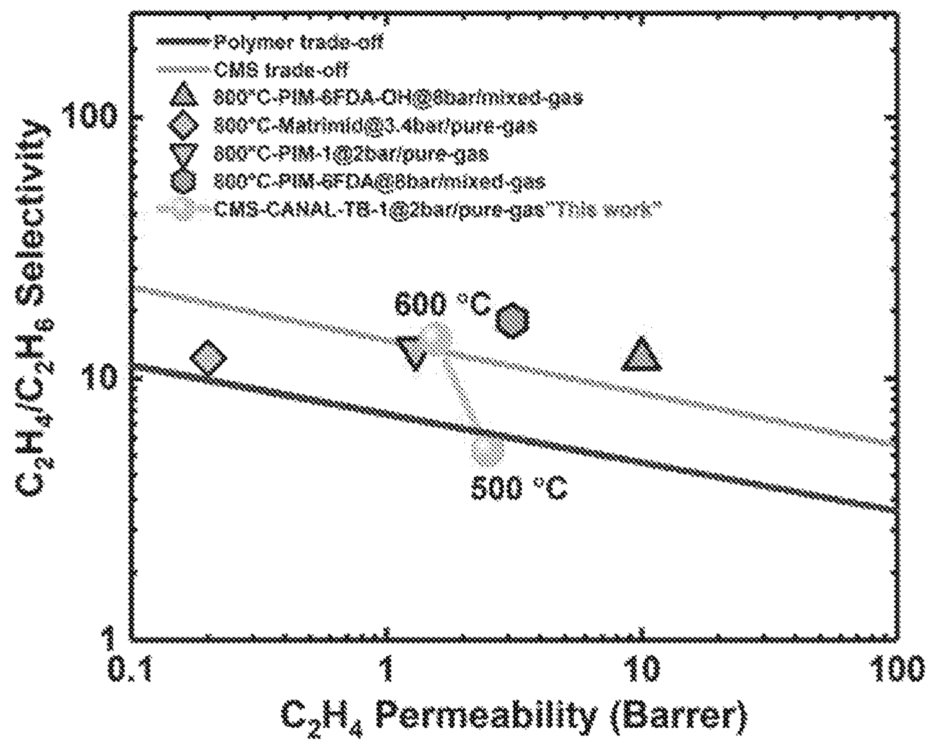
FIG. 11 is a graphical view showing a comparison of the $C_2H_4/C_2H_6$ performance of the 500 and 600° C.-CANAL-TB-1 based CMS membranes to previously reported CMS membranes in the literature, according to one or more embodiments of the invention.

The 500 and 600° C. heat-treated CANAL-TB-1 based CMS membranes were tested for the much more challenging separation of $C_2H_4/C_2H_6$. As shown in the FIG. 11, the performance of the CANAL-TB-1 derived CMS membranes was similar compared to previously reported CMS membranes; in fact, the properties of the 600° C.-CANAL-TB-1 based CMS membrane overlapped with those of the 800° C. heat-treated PIM-1 based CMS membrane.

TABLE 1

Gas Permeability and Selectivity of Pristine and Heat-Treated CANAL-TB-1 Membranes

| | Permeability (Barrer)[a] | | | | | | Selectivity | | | | |
|---|---|---|---|---|---|---|---|---|---|---|---|
| Temperature (° C.) | He | $H_2$ | $N_2$ | $O_2$ | $CH_4$ | $CO_2$ | $H_2/CH_4$ | $O_2/N_2$ | $CO_2/CH_4$ | $N_2/CH_4$ | $H_2/CO_2$ |
| Pristine | 1196 | 3367 | 220 | 838 | 312 | 3435 | 10.8 | 3.8 | 11.0 | 0.71 | 0.98 |
| 500 | 85 | 150 | 1.9 | 14 | 1.2 | 61 | 123 | 7.5 | 50 | 1.5 | 2.5 |
| 600 | 130 | 307 | 2.2 | 20 | 0.57 | 80 | 539 | 9 | 140 | 3.8 | 3.8 |
| 700 | 33 | 85 | 0.15 | 2 | 0.015 | 6.45 | 5743 | 13 | 436 | 10 | 13 |
| 800 | 19 | 28 | — | — | — | 0.61 | — | — | — | — | 46 |
| 850 | 8.6 | 11 | — | — | — | 0.075 | — | — | — | — | 147 |
| 900[b] | 4.8 | 4.8 | — | — | — | 0.0053 | — | — | — | — | 905 |

[a]1 Barrer = $10^{-10}$ $cm^3$ (STP) cm $cm^{-2}$ $s^{-1}$ $cmHg^{-1}$ or 7.6 × $10^{-18}$ $m^3$ (STP) m $m^{-2}$ $s^{-1}Pa^{-1}$. The measurements were carried out at 35° C.; upstream pressure was 2 atm.

[b]The measurements were carried out at an upstream pressure of 10 atm.

Example 3

Separation Performance of Trip-TB-2 Based CMS Membranes

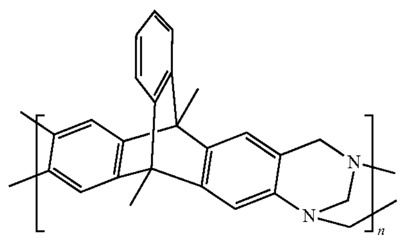

PIM-Trip-TB-2

Figure 12B:
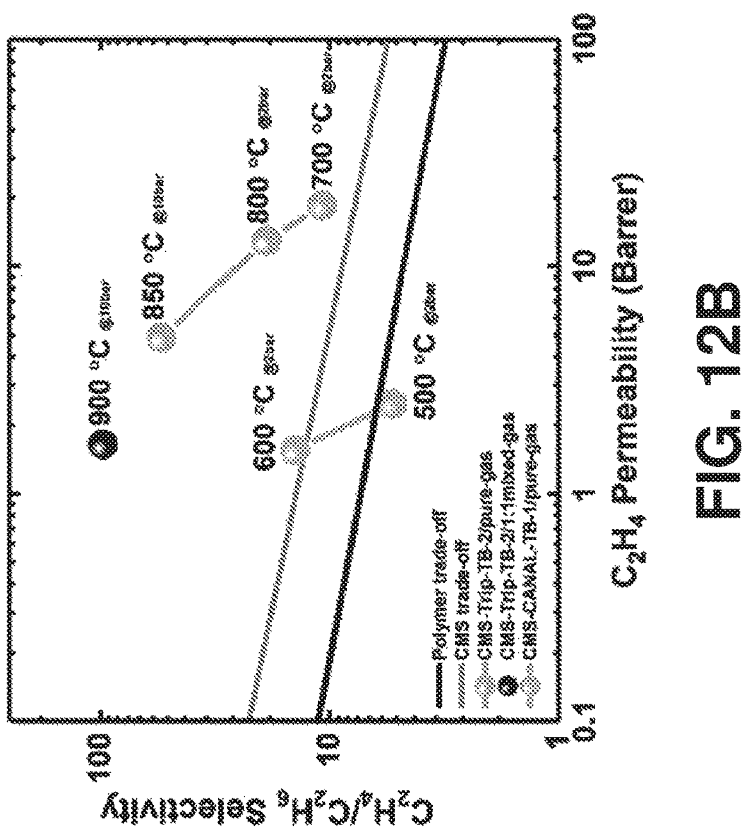
FIGS. 12A-12B are graphical views showing the separation performance comparison of CMS-CANAL-TB-1 and CMS-Trip-TB-2 for: (a) $H_2/CO_2$ and (b) $C_2H_4/C_2H_6$, according to one or more embodiments of the invention.
Figure 12A:
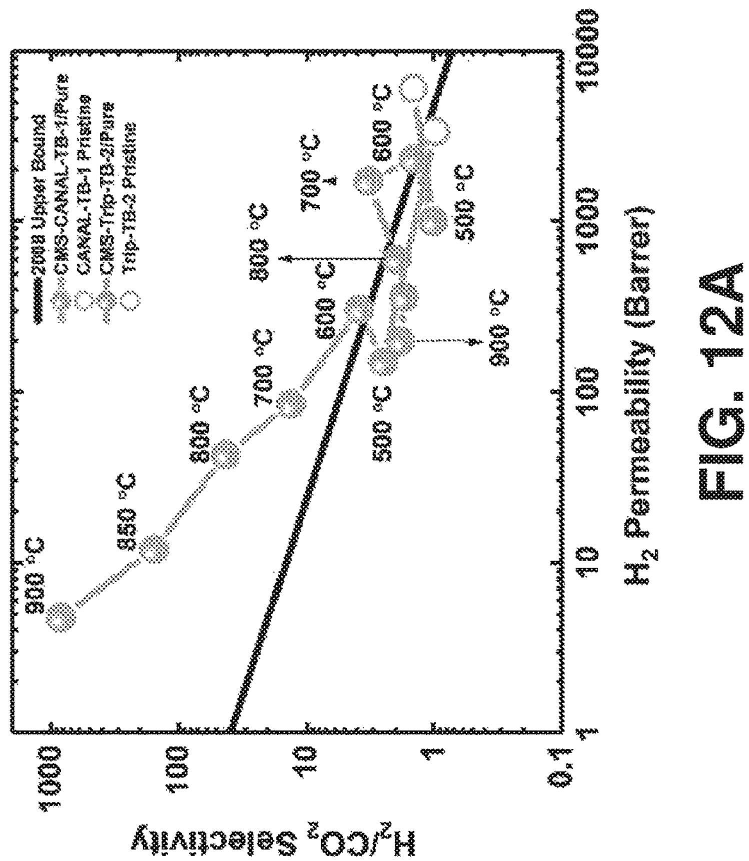

As described above, the pore size in the carbon membranes was believed to be closely related to the size of the contortion site in the pristine polymer (e.g., the polymer precursor prior to pyrolysis). It is believed that pristine polymers of intrinsic microporosity with a larger contortion site may form CMS membranes with larger pore size, and, hence, higher gas permeability. In this regard, Trip-TB-2 based carbon membranes showed much higher permeability for all gases (Table 2) compared to the CANAL-TB-1 based CMS membranes (Table 1). Similarly, the Trip-TB-2 based CMS membranes showed a marked decrease in permeability of all gases as the pyrolysis temperature increased. As far as selectivity is concerned, all gas pairs showed a noticeable increase except for $H_2/CO_2$. In particular, FIG. 12A shows no $H_2/CO_2$ selectivity for the Trip-TB-2 based CMS membranes as compared to the ultrahigh selectivity for the CANAL-TB-1 based CMS membranes. However, FIG. 12B shows an unprecedented $C_2H_4/C_2H_6$ performance of the Trip-TB-2 based carbon membranes tested under both pure- and mixed-gas conditions.

TABLE 2

Gas Permeability and Selectivity of Pristine and Heat-Treated Trip-TB-2 Membranes

| | Permeability (Barrer)[a] | | | | | | Selectivity | | | | |
|---|---|---|---|---|---|---|---|---|---|---|---|
| Temperature (° C.) | He | $H_2$ | $N_2$ | $O_2$ | $CH_4$ | $CO_2$ | $H_2/CH_4$ | $O_2/N_2$ | $CO_2/CH_4$ | $N_2/CH_4$ | $H_2/CO_2$ |
| Pristine | 2200 | 6015 | 195 | 1140 | 385 | 4150 | 15.6 | 5.9 | 10.8 | 0.5 | 1.5 |
| 500 | 391 | 1004 | 52 | 206 | 64 | 992 | 15.8 | 4.0 | 15.6 | 0.8 | 1 |
| 600 | 678 | 2314 | 52 | 422 | 34 | 1603 | 68 | 8.1 | 47.2 | 1.5 | 1.4 |
| 700 | 555 | 1720 | 16 | 130 | 6.8 | 530 | 254 | 8.1 | 78.4 | 2.4 | 3.3 |
| 800 | 141 | 600 | 10 | 74 | 3.6 | 305 | 166 | 7.4 | 84.4 | 2.8 | 2 |
| 850 | 122 | 363 | 5.1 | 44 | 0.46 | 211 | 789 | 8.6 | 459 | 11 | 1.7 |
| 900 | 75 | 200 | 3.1 | 22.5 | 0.27 | 110 | 752 | 7.2 | 414 | 12 | 1.8 |

[a]1 Barrer = $10^{-10}$ $cm^3$ (STP) cm $cm^{-2}$ $s^{-1}$ cm $Hg^{-1}$ or 7.6 × $10^{-18}$ $m^3$ (STP) m $m^{-2}$ $s^{-1}Pa^{-1}$. The measurements were carried out at 35° C.; upstream pressure was 2 atm.

Figure 13:
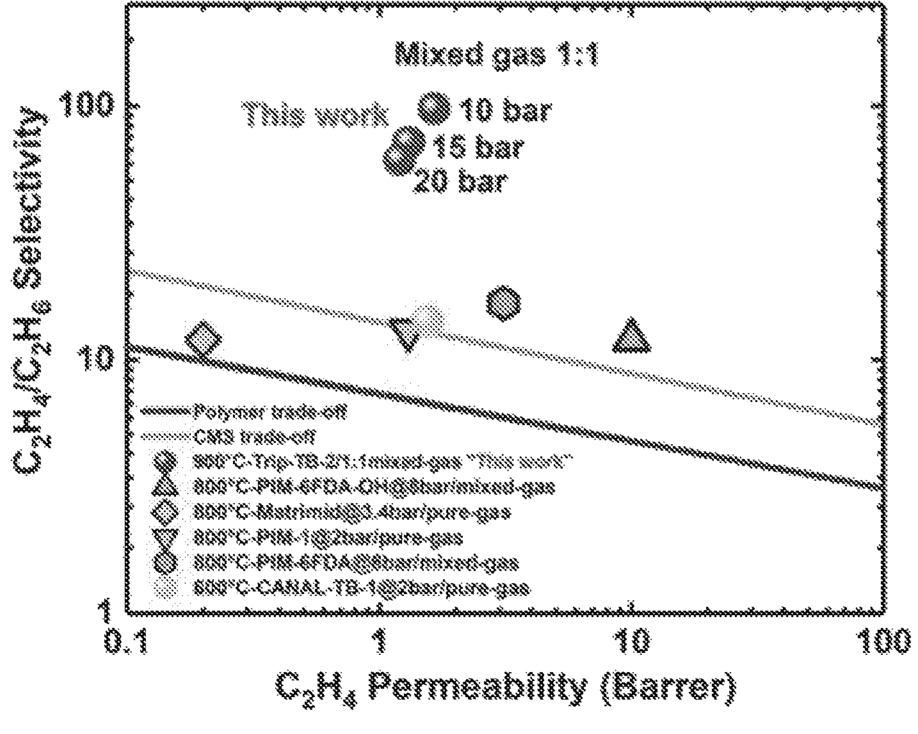
FIG. 13 is a graphical view showing a comparison of the $C_2H_4/C_2H_6$ separation performance of the 900° C. heat-treated Trip-TB-2 based CMS membranes to previously reported CMS membranes in the literature, according to one or more embodiments of the invention.

The $C_2H_4$ mixed-gas permeability and $C_2H_4/C_2H_6$ selectivity of the 900° C.-Trip-TB-2 based CMS membrane dropped slightly when the total feed pressure of a 1:1 feed mixture increased from 10 to 20 bar, but the performance was still far better than of current state-of-the-art reported carbon membranes, as shown in FIG. 13. The performance of PIM-Trip-TB-2-derived CMS membranes pyrolized at 900° C. for ethylene/ethane separation is compared to previously reported polymer and CMS membranes in FIG. 13. As illustrated in FIG. 13, membranes prepared according to the present disclosure exhibit performance that is far superior to any other membrane type previously reported. This result demonstrates unprecedented performance of Trip-TB-2 based CMS membranes for $C_2H_4/C_2H_6$ separation.

Example 4

Separation Performance of Conventional CMS Membranes

For comparison, the separation performance of conventional or previously reported CMS membranes for a number of gas pairs—including $CO_2/CH_4$, $H_2/CH_4$, $O_2/N_2$, $H_2/CO_2$, $C_2H_4/C_2H_6$, and $C_3H_6/C_3H_8$—is shown in FIGS. 14A-14E. As is evident from these figures, conventional CMS membranes for these gas pairs, including the more challenging gas separation applications, still require further improvement to overcome the limitations of conventional state-of-the-art polymeric membrane materials. As shown, to achieve the required product purity (often more than 99%) and provide high recovery, further developments in conventional materials is required.

What is claimed is:

1. A carbon molecular sieve membrane comprising: a pyrolysis product of an oxygen-free ladder polymer of intrinsic microporosity, wherein the carbon molecular sieve membrane is substantially free of oxygen, and wherein no oxygen-containing compounds are evolved during pyrolysis.

2. The carbon molecular sieve membrane of claim 1, wherein the oxygen-free ladder polymer of intrinsic microporosity includes one or more of spirobisindane, spirobifluorene, ethanoanthracene, tetraphenylethylene, triptycene, arene norbornene, Tröger's base, and derivatives thereof.

3. The carbon molecular sieve membrane of claim 1, wherein the pyrolysis product of the oxygen-free ladder polymer of intrinsic microporosity includes a pyrolyzed oxygen-free ladder polymer of intrinsic microporosity.

4. The carbon molecular sieve membrane of claim 1, wherein the pyrolysis product of the oxygen-free ladder polymer of intrinsic microporosity includes a 500° C. to 1200° C. pyrolyzed oxygen-free ladder polymer of intrinsic microporosity.

5. The carbon molecular sieve membrane of claim 1, wherein the oxygen-free ladder polymer of intrinsic microporosity includes a repeat unit with the structure of formula (I):

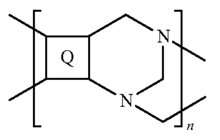

wherein:

Q is an optionally substituted tetravalent oxygen-free moiety; and n is at least 1.

6. The carbon molecular sieve membrane of claim 5, wherein Q is selected from the group consisting of:

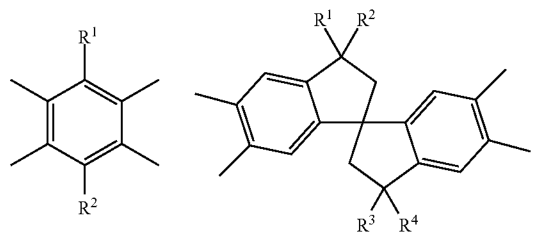

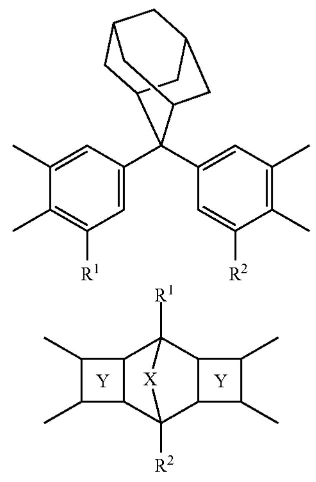

wherein:

$R^1$, $R^2$, $R^3$, and $R^4$ are independently selected from the group consisting of hydrogen, a substituted or unsubstituted linear or branched alkyl group, a substituted or unsubstituted aryl group, a substituted or unsubstituted heterocyclic group, a halogen group, a nitrile group, a trifluoromethyl group, and combinations thereof;

X is a divalent moiety selected from a substituted and unsubstituted alkyl group, a substituted and unsubstituted alkenyl group, a substituted and unsubstituted aryl group, a substituted and unsubstituted polycyclic group, and a substituted and unsubstituted polyaromatic group; and Y is a tetravalent moiety independently selected from a substituted and unsubstituted aryl group, a substituted and unsubstituted heteroaryl group, a substituted and unsubstituted alicyclic group, a substituted and unsubstituted heterocyclic group, a substituted and unsubstituted polycyclic group, and a substituted and unsubstituted polyaromatic group.

7. The carbon molecular sieve membrane of claim 6, wherein X is selected from: $—CH_2—$, $—CH_2CH_2—$, $—CH=CH—$,

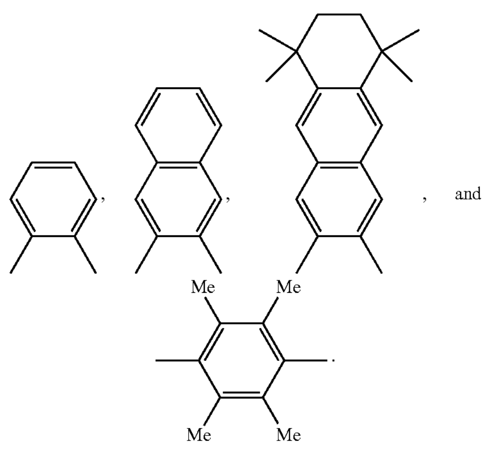

, and

8. The carbon molecular sieve membrane of claim 6, wherein Y is independently selected from:

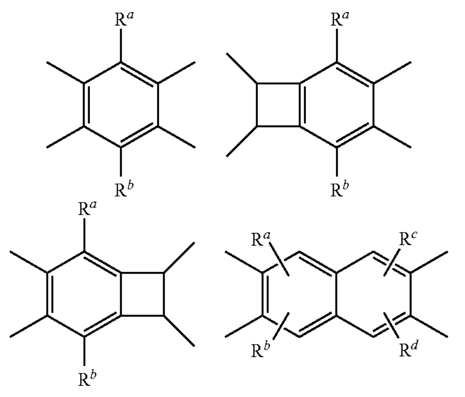

wherein:

$R^a$, $R^b$, $R^c$, and $R^d$ are independently selected from hydrogen, halogen, a substituted and unsubstituted alkyl group, a substituted and unsubstituted aliphatic group, a substituted and unsubstituted cycloalkyl group, a substituted and unsubstituted aryl group, a substituted and unsubstituted heterocyclic group, groups having a —S— moiety, groups having a —B< moiety, groups having a —N< moiety, groups having a —P< moiety, groups having a —Si≡ moiety, an amino group, and a cyano group.

9. The carbon molecular sieve membrane of claim 1, wherein the oxygen-free ladder polymer of intrinsic microporosity includes a repeat unit with one of the following structures:

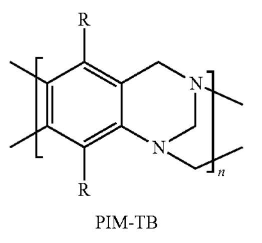

PIM-TB

-continued

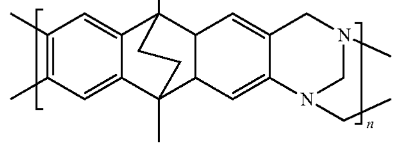

PIM-EA-TB

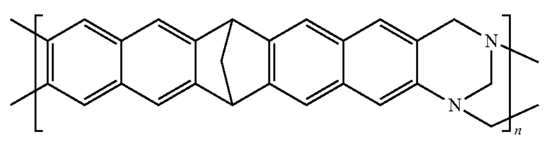

PIM-MP-TB

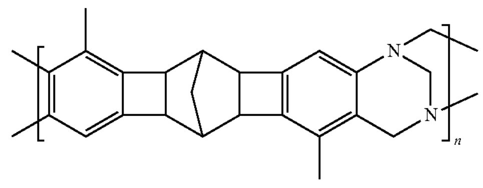

Canal-TB-1

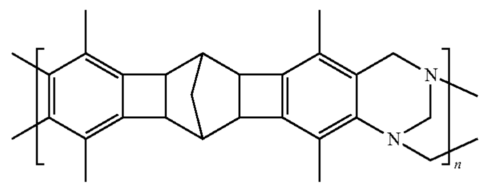

Canal-TB-2

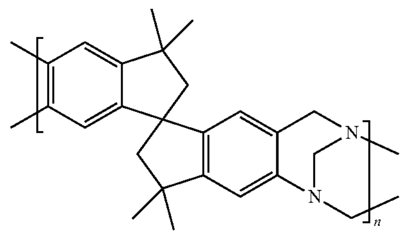

PIM-SBI-TB

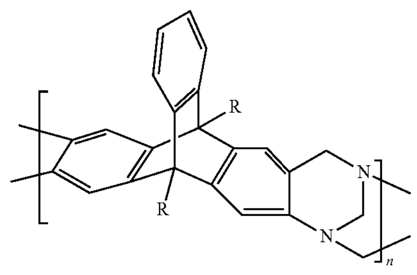

PIM-Trip-TB

-continued

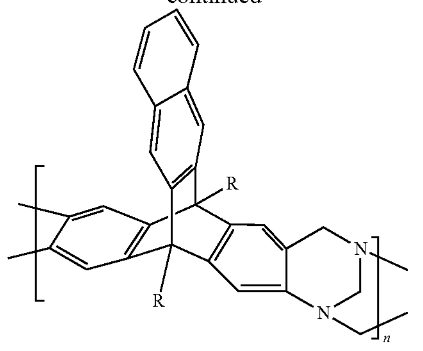

PIM-BTrip-TB

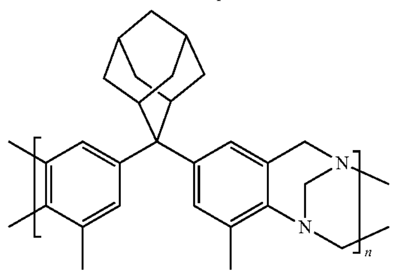

TB-Ad-Me

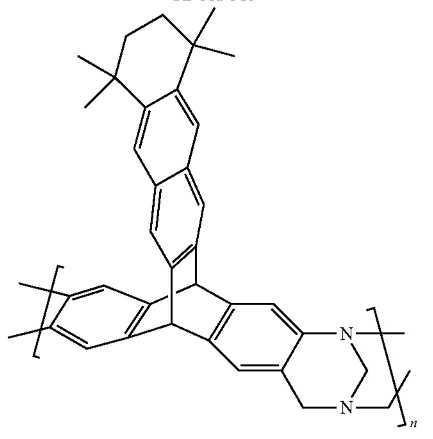

wherein each R and R' is independently selected from H, Me, F, Cl, Br, an optionally substituted linear alkyl, and an optionally substituted branched alkyl.

10. The carbon molecular sieve membrane of claim 1, wherein the oxygen-free ladder polymer of intrinsic microporosity includes a repeat unit with the structure of formula (II):

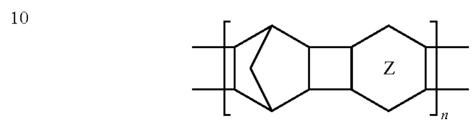

wherein:

Z is an optionally substituted oxygen-free tetravalent moiety; and n is at least 1.

11. The carbon molecular sieve membrane of claim 10, wherein the oxygen-free ladder polymer of intrinsic microporosity includes a repeat unit with the following structure:

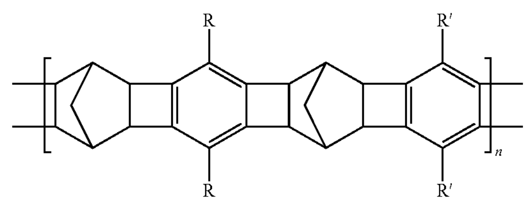

wherein each R and R' is independently selected from H, Me, F, Cl, Br, an optionally substituted linear alkyl, and an optionally substituted branched alkyl.

* * * * *